US011778655B2

(12) United States Patent
Xue et al.

(10) Patent No.: US 11,778,655 B2
(45) Date of Patent: Oct. 3, 2023

(54) TECHNIQUES FOR CONFIGURING MULTIPLE FREQUENCY DOMAIN OPPORTUNITIES FOR SIDELINK FEEDBACK

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Peter Gaal, San Diego, CA (US); Juan Montojo, San Diego, CA (US); Ozcan Ozturk, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/099,492

(22) Filed: Nov. 16, 2020

(65) Prior Publication Data

US 2022/0159709 A1    May 19, 2022

(51) Int. Cl.
*H04W 74/00*      (2009.01)
*H04L 27/26*      (2006.01)
(Continued)

(52) U.S. Cl.
CPC ....... *H04W 74/002* (2013.01); *H04L 27/2605* (2013.01); *H04W 72/0453* (2013.01); *H04W 92/18* (2013.01)

(58) Field of Classification Search
CPC ........... H04W 74/002; H04W 72/0453; H04W 92/18; H04W 76/14; H04W 74/0808;
(Continued)

(56) References Cited

U.S. PATENT DOCUMENTS

2018/0213379 A1*  7/2018  Xiong ............... H04W 4/70
2020/0029318 A1*  1/2020  Guo .................. H04W 72/042
(Continued)

FOREIGN PATENT DOCUMENTS

CN       111432469 B   *  4/2022   ......... H04W 68/005
EP       3905733 A1    * 11/2021   ............. H04W 4/06
(Continued)

OTHER PUBLICATIONS

Xiaoxia et al , How does unlicensed spectrum with NR-U transform what 5G can do for you?, @qualcomm_tech, Jun. 2020 (Year: 2020).*

(Continued)

*Primary Examiner* — Mounir Moutaouakil
(74) *Attorney, Agent, or Firm* — Dalei Dong; Holland & Hart LLP

(57) ABSTRACT

Methods, systems, and devices for wireless communications are described. In some systems, a user equipment (UE) may receive a configuration of a set of feedback channel occasions corresponding to a first sidelink data channel in a first listen-before-talk (LBT) sub-band, the set of feedback channel occasions located over multiple LBT sub-bands of an unlicensed radio frequency spectrum band. The UE may receive a data transmission over the first sidelink data channel and may determine to transmit feedback associated with the data transmission. The UE, based on the configuration of the set of feedback channel occasions, may perform LBT for each of the set of feedback channel occasions to determine which of the set of feedback channel occasions are available to the UE for transmitting the feedback associated with the data transmission. The UE may transmit feedback over one or more of the set of feedback channel occasions accordingly.

28 Claims, 15 Drawing Sheets

(51) Int. Cl.
*H04W 72/0453* (2023.01)
*H04W 92/18* (2009.01)

(58) Field of Classification Search
CPC .. H04W 16/14; H04W 88/04; H04L 27/2605; H04L 27/0006; H04L 1/1854; H04L 1/1861
See application file for complete search history.

(56) References Cited

U.S. PATENT DOCUMENTS

| | | | |
|---|---|---|---|
| 2020/0119849 A1 | 4/2020 | Su et al. | |
| 2020/0267565 A1 | 8/2020 | Salem | |
| 2021/0050953 A1* | 2/2021 | Park | H04L 5/0094 |
| 2021/0105768 A1* | 4/2021 | Nguyen | H04L 1/1861 |
| 2021/0195637 A1* | 6/2021 | Xue | H04W 74/0808 |
| 2021/0314104 A1* | 10/2021 | Yin | H04L 1/1812 |
| 2022/0061090 A1* | 2/2022 | Fehrenbach | H04W 74/0808 |
| 2022/0150949 A1* | 5/2022 | Sun | H04W 72/14 |
| 2022/0150960 A1* | 5/2022 | Sun | H04W 72/0453 |
| 2022/0183064 A1 | 6/2022 | Talarico et al. | |
| 2023/0037493 A1* | 2/2023 | Wu | H04W 24/08 |

FOREIGN PATENT DOCUMENTS

| | | | | |
|---|---|---|---|---|
| WO | WO-2020069114 A1 * | 4/2020 | | H04W 16/14 |
| WO | WO-2021030024 A1 * | 2/2021 | | H04L 1/1812 |
| WO | WO-2021209121 A1 * | 10/2021 | | H04L 27/0006 |
| WO | WO-2021237721 A1 * | 12/2021 | | H04L 1/1812 |
| WO | WO-2022021314 A1 * | 2/2022 | | H04L 1/1607 |

OTHER PUBLICATIONS

International Search Report and Written Opinion—PCT/US2021/071836—ISA/EPO—dated Feb. 2, 2022.

* cited by examiner

TECHNIQUES FOR CONFIGURING MULTIPLE FREQUENCY DOMAIN OPPORTUNITIES FOR SIDELINK FEEDBACK

FIELD OF DISCLOSURE

The following relates to wireless communications, including techniques for configuring multiple frequency domain opportunities for sidelink feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, two or more UEs may communicate with each other over a sidelink channel. In some cases, a first UE may transmit a sidelink transmission to a second UE with feedback requested, and the second UE may transmit feedback to the first UE accordingly.

SUMMARY

The described techniques relate to improved methods, systems, devices, and apparatuses that support techniques for configuring multiple frequency domain opportunities for sidelink feedback. In some examples, a first user equipment (UE) and a second UE may communicate over a sidelink channel, such as a sidelink data channel. The first UE may transmit data to the second UE over a first sub-band of the sidelink data channel and, in some examples, the second UE may transmit feedback (such as hybrid automatic repeat request (HARQ) feedback) to the first UE indicating whether the second UE was able to successfully receive the sidelink transmission. For instance, in examples in which the second UE successfully receives the sidelink transmission, the second UE may transmit an acknowledgement (ACK) to the first UE. Alternatively, in examples in which the second UE unsuccessfully receives the sidelink transmission, the second UE may transmit a negative ACK (NACK) to the first UE.

In some implementations of the present disclosure, the second UE may receive a configuration of multiple opportunities or occasions over which the second UE may transmit feedback to the first UE and the multiple opportunities or occasions may be located in multiple sub-bands of an unlicensed radio frequency spectrum band. In some aspects, such opportunities or occasions may be referred to herein as feedback channel occasions, and may refer to a set of time and frequency resources of a physical sidelink feedback channel (PSFCH) such that they may be equivalently referred to as PSFCH opportunities or occasions. In some examples, the configuration may indicate a correspondence between the first sub-band over which the second UE receives the transmission from the first UE and the multiple feedback channel occasions. As such, the second UE may identify or otherwise determine the multiple feedback channel occasions based on receiving the transmission over the first sub-band and based on the correspondence indicated by the configuration. The second UE may perform a listen-before-talk (LBT) procedure for each of the multiple feedback channel occasions to determine which of the multiple feedback channel occasions are available (e.g., which feedback channel occasions pass LBT and are not being used by another device) and the second UE may transmit feedback to the second UE over one or more of the multiple feedback channel occasions based on the outcome of the LBT procedures.

In some examples, the configuration of the multiple feedback channel occasions may indicate multiple feedback channel pools. In such examples, the configuration may indicate a correspondence between the first sub-band and a first feedback channel pool, where the first feedback channel pool may include feedback channel occasions located in multiple different sub-bands. In some other examples, the configuration of the multiple feedback channel occasions may indicate one feedback channel pool. In such examples, the configuration may indicate an index of a second sub-band and an offset value between the first sub-band and the second sub-band, and the second UE may determine whether the multiple feedback channel occasions that correspond to the first sub-band include a feedback channel occasion located in the second sub-band based on whether the sidelink data channel in the second sub-band carries a unicast transmission and based on a formula for a sequence index.

A method for wireless communication at a UE is described. The method may include receiving a transmission over a first sidelink data channel in a first sub-band of an unlicensed radio frequency spectrum band, performing a LBT for each of a set of multiple feedback channel occasions corresponding to the first sidelink data channel in the first sub-band, the set of multiple feedback channel occasions in a set of multiple sub-bands, and transmitting feedback associated with the transmission over one or more feedback channel occasions of the set of multiple feedback channel occasions based on the LBT for each of the set of multiple feedback channel occasions.

An apparatus for wireless communication at a UE is described. The apparatus may include a processor, memory in electronic communication with the processor, and instructions stored in the memory. The instructions may be executable by the processor to cause the apparatus to receive a transmission over a first sidelink data channel in a first sub-band of an unlicensed radio frequency spectrum band, perform a LBT for each of a set of multiple feedback channel occasions corresponding to the first sidelink data channel in the first sub-band, the set of multiple feedback channel occasions in a set of multiple sub-bands, and transmit feedback associated with the transmission over one or more feedback channel occasions of the set of multiple feedback channel occasions based on the LBT for each of the set of multiple feedback channel occasions.

Another apparatus for wireless communication at a UE is described. The apparatus may include means for receiving a transmission over a first sidelink data channel in a first sub-band of an unlicensed radio frequency spectrum band, means for performing a LBT for each of a set of multiple feedback channel occasions corresponding to the first sidelink data channel in the first sub-band, the set of multiple feedback channel occasions in a set of multiple sub-bands, and means for transmitting feedback associated with the transmission over one or more feedback channel occasions of the set of multiple feedback channel occasions based on the LBT for each of the set of multiple feedback channel occasions.

A non-transitory computer-readable medium storing code for wireless communication at a UE is described. The code may include instructions executable by a processor to receive a transmission over a first sidelink data channel in a first sub-band of an unlicensed radio frequency spectrum band, perform a LBT for each of a set of multiple feedback channel occasions corresponding to the first sidelink data channel in the first sub-band, the set of multiple feedback channel occasions in a set of multiple sub-bands, and transmit feedback associated with the transmission over one or more feedback channel occasions of the set of multiple feedback channel occasions based on the LBT for each of the set of multiple feedback channel occasions.

Some examples of the method, apparatuses, and non-transitory computer-readable medium described herein may further include operations, features, means, or instructions for receiving a control message including a configuration of the set of multiple feedback channel occasions corresponding to the first sidelink data channel in the first sub-band, where performing the LBT for each of the set of multiple feedback channel occasions may be based on the configuration of the set of multiple feedback channel occasions.

In some examples of the method, apparatuses, and non-transitory computer-readable medium described herein, receiving the control message including the configuration of the set of multiple feedback channel occasions may include operations, features, means, or instructions for receiving the control message including the configuration indicating a set of multiple feedback channel pools, each of the set of multiple feedback channel pools corresponding to one sub-band of the unlicensed radio frequency spectrum band, where the set of multiple feedback channel occasions includes one feedback channel pool of the set of multiple feedback channel pools.

In some examples of the method, apparatuses, and non-transitory computer-readable medium described herein, the configuration indicating the set of multiple feedback channel pools includes a set of multiple bit vectors, each bit vector indicating a different one of the set of multiple feedback channel pools.

In some examples of the method, apparatuses, and non-transitory computer-readable medium described herein, the set of multiple feedback channel occasions may be associated with groupcast feedback and the method, apparatuses, and non-transitory computer-readable medium may include further operations, features, means, or instructions for determining that a group member identifier (ID) of the UE may be less than a product of a quantity of physical resource blocks (PRBs) of a feedback channel occasion of the set of multiple feedback channel occasions and a cyclic shift value associated with the feedback channel occasion and including the feedback channel occasion in the set of multiple feedback channel occasions based on determining that the group member ID of the UE may be less than the product of the quantity of PRBs and the cyclic shift value.

In some examples of the method, apparatuses, and non-transitory computer-readable medium described herein, the set of multiple feedback channel occasions may be associated with groupcast feedback and the method, apparatuses, and non-transitory computer-readable medium may include further operations, features, means, or instructions for determining that a quantity of UEs providing the groupcast feedback may be less than a product of a quantity of PRBs of a feedback channel occasion of the set of multiple feedback channel occasions and a cyclic shift value associated with the feedback channel occasion and including the feedback channel occasion in the set of multiple feedback channel occasions based on determining that the quantity of UEs providing the groupcast feedback may be less than the product of the quantity of PRBs and the cyclic shift value.

In some examples of the method, apparatuses, and non-transitory computer-readable medium described herein, the set of multiple feedback channel occasions may be associated with groupcast feedback and the method, apparatuses, and non-transitory computer-readable medium may include further operations, features, means, or instructions for identifying that the set of multiple feedback channel occasions includes a first feedback channel occasion in the first sub-band and a second feedback channel occasion in a second sub-band, determining that a first product of a first quantity of PRBs of the first feedback channel occasion and a first cyclic shift value associated with the first feedback channel occasion may be less than a second product of a second quantity of PRBs of the second feedback channel occasion and a second cyclic shift value associated with the second feedback channel occasion, and including the first feedback channel occasion and the second feedback channel occasion in the set of multiple feedback channel occasions based on determining that the first product may be less than the second product.

In some examples of the method, apparatuses, and non-transitory computer-readable medium described herein, receiving the control message including the configuration of the set of multiple feedback channel occasions may include operations, features, means, or instructions for receiving the control message including the configuration indicating an index associated with a second sub-band and an offset value between the first sub-band and the second sub-band, where the set of multiple feedback channel occasions include a first feedback channel occasion located in the first sub-band and a second feedback channel occasion located in the second sub-band.

In some examples of the method, apparatuses, and non-transitory computer-readable medium described herein, the transmission may be a unicast transmission and the method, apparatuses, and non-transitory computer-readable medium may include further operations, features, means, or instructions for detecting a second unicast transmission over a second sidelink data channel in the second sub-band based on the index associated with the second sub-band and selecting the first feedback channel occasion and the second feedback channel occasion as two of the set of multiple feedback channel occasions based on detecting the second unicast transmission in the second sub-band and a formula.

In some examples of the method, apparatuses, and non-transitory computer-readable medium described herein, the formula includes a first product of a summation of an ID associated with a transmitting UE from which the transmission may be received and the offset value between the first sub-band and the second sub-band and a modulo operation of a second product of a quantity of PRBs of the first feedback channel occasion and a cyclic shift value associated with the first feedback channel occasion.

In some examples of the method, apparatuses, and non-transitory computer-readable medium described herein, transmitting the feedback associated with the transmission over the one or more feedback channel occasions of the set of multiple feedback channel occasions may include operations, features, means, or instructions for transmitting the feedback over each feedback channel occasion of the set of multiple feedback channel occasions that may be associated with a successful LBT and that may be located in an earliest symbol period including a feedback channel occasion.

Some examples of the method, apparatuses, and non-transitory computer-readable medium described herein may further include operations, features, means, or instructions for receiving a configuration indicating a primary feedback channel occasion and one or more secondary feedback channel occasions of the set of multiple feedback channel occasions, where transmitting the feedback associated with the transmission over the one or more feedback channel occasions of the set of multiple feedback channel occasions may include operations, features, means, or instructions for transmitting the feedback over the primary feedback channel occasion or over any of the one or more secondary feedback channel occasions based on whether the primary feedback channel occasion may be associated with a successful LBT.

Some examples of the method, apparatuses, and non-transitory computer-readable medium described herein may further include operations, features, means, or instructions for receiving a configuration indicating a priority of the set of multiple feedback channel occasions, where transmitting the feedback associated with the transmission over the one or more feedback channel occasions of the set of multiple feedback channel occasions may include operations, features, means, or instructions for transmitting the feedback over a feedback channel occasion of the set of multiple feedback channel occasions that may have a highest priority and that may be associated with a successful LBT.

In some examples of the method, apparatuses, and non-transitory computer-readable medium described herein, transmitting the feedback associated with the transmission over the one or more feedback channel occasions of the set of multiple feedback channel occasions may include operations, features, means, or instructions for transmitting the feedback over each feedback channel occasion of the set of multiple feedback channel occasions that may be associated with a successful LBT.

In some examples of the method, apparatuses, and non-transitory computer-readable medium described herein, transmitting the feedback associated with the transmission over the one or more feedback channel occasions of the set of multiple feedback channel occasions may include operations, features, means, or instructions for transmitting the feedback over a first feedback channel occasion within a same channel occupancy time (COT) of the transmission based on a cyclic prefix extension.

Some examples of the method, apparatuses, and non-transitory computer-readable medium described herein may further include operations, features, means, or instructions for determining that a priority of the transmission satisfies a threshold priority, that the first feedback channel occasion may be an only feedback channel occasion that satisfies a packet delay budget of the transmission, that the first feedback channel occasion may be in a last symbol period including a feedback channel occasion, that previous cyclic prefix extensions may have occurred below a threshold amount, that the first feedback channel occasion may be configured for transmitting the feedback within the same COT, or any combination thereof, where transmitting the feedback over the first feedback channel occasion within the same COT of the transmission may be based on the determining.

A method for wireless communication at a UE is described. The method may include transmitting a control message including a configuration of a set of multiple feedback channel occasions in a set of multiple sub-bands of an unlicensed radio frequency spectrum band corresponding to a first sidelink data channel in a first sub-band of the unlicensed radio frequency spectrum band, transmitting a transmission over the first sidelink data channel in the first sub-band of the unlicensed radio frequency spectrum band, and receiving feedback associated with the transmission over one or more feedback channel occasions of the set of multiple feedback channel occasions based on a LBT for each of the set of multiple feedback channel occasions.

An apparatus for wireless communication at a UE is described. The apparatus may include a processor, memory in electronic communication with the processor, and instructions stored in the memory. The instructions may be executable by the processor to cause the apparatus to transmit a control message including a configuration of a set of multiple feedback channel occasions in a set of multiple sub-bands of an unlicensed radio frequency spectrum band corresponding to a first sidelink data channel in a first sub-band of the unlicensed radio frequency spectrum band, transmit a transmission over the first sidelink data channel in the first sub-band of the unlicensed radio frequency spectrum band, and receive feedback associated with the transmission over one or more feedback channel occasions of the set of multiple feedback channel occasions based on a LBT for each of the set of multiple feedback channel occasions.

Another apparatus for wireless communication at a UE is described. The apparatus may include means for transmitting a control message including a configuration of a set of multiple feedback channel occasions in a set of multiple sub-bands of an unlicensed radio frequency spectrum band corresponding to a first sidelink data channel in a first sub-band of the unlicensed radio frequency spectrum band, means for transmitting a transmission over the first sidelink data channel in the first sub-band of the unlicensed radio frequency spectrum band, and means for receiving feedback associated with the transmission over one or more feedback channel occasions of the set of multiple feedback channel occasions based on a LBT for each of the set of multiple feedback channel occasions.

A non-transitory computer-readable medium storing code for wireless communication at a UE is described. The code may include instructions executable by a processor to transmit a control message including a configuration of a set of multiple feedback channel occasions in a set of multiple sub-bands of an unlicensed radio frequency spectrum band corresponding to a first sidelink data channel in a first sub-band of the unlicensed radio frequency spectrum band, transmit a transmission over the first sidelink data channel in the first sub-band of the unlicensed radio frequency spectrum band, and receive feedback associated with the transmission over one or more feedback channel occasions of the set of multiple feedback channel occasions based on a LBT for each of the set of multiple feedback channel occasions.

In some examples of the method, apparatuses, and non-transitory computer-readable medium described herein, transmitting the control message including the configuration of the set of multiple feedback channel occasions may include operations, features, means, or instructions for transmitting the control message including the configuration indicating a set of multiple feedback channel pools, each of the set of multiple feedback channel pools corresponding to one sub-band of the unlicensed radio frequency spectrum band, where the set of multiple feedback channel occasions includes one feedback channel pool of the set of multiple feedback channel pools.

In some examples of the method, apparatuses, and non-transitory computer-readable medium described herein, the configuration indicating the set of multiple feedback channel pools includes a set of multiple bit vectors, each bit vector indicating a different one of the set of multiple feedback channel pools.

In some examples of the method, apparatuses, and non-transitory computer-readable medium described herein, transmitting the control message including the configuration of the set of multiple feedback channel occasions may include operations, features, means, or instructions for transmitting the control message including the configuration indicating an index associated with a second sub-band and an offset value between the first sub-band and the second sub-band, where the set of multiple feedback channel occasions include a first feedback channel occasion located in the first sub-band and a second feedback channel occasion located in the second sub-band.

In some examples of the method, apparatuses, and non-transitory computer-readable medium described herein, receiving the feedback associated with the transmission over the one or more feedback channel occasions of the set of multiple feedback channel occasions may include operations, features, means, or instructions for receiving the feedback over each feedback channel occasion of the set of multiple feedback channel occasions that may be associated with a successful LBT and that may be located in an earliest symbol period including a feedback channel occasion.

Some examples of the method, apparatuses, and non-transitory computer-readable medium described herein may further include operations, features, means, or instructions for transmitting the control message includes transmitting the configuration indicating a primary feedback channel occasion and one or more secondary feedback channel occasions of the set of multiple feedback channel occasions and receiving the feedback associated with the transmission over the one or more feedback channel occasions of the set of multiple feedback channel occasions includes receiving the feedback over the primary feedback channel occasion or over any of the one or more secondary feedback channel occasions based on whether the primary feedback channel occasion may be associated with a successful LBT.

Some examples of the method, apparatuses, and non-transitory computer-readable medium described herein may further include operations, features, means, or instructions for transmitting the control message includes transmitting the configuration indicating a priority of the set of multiple feedback channel occasions and receiving the feedback associated with the transmission over the one or more feedback channel occasions of the set of multiple feedback channel occasions includes receiving the feedback over a feedback channel occasion of the set of multiple feedback channel occasions that may have a highest priority and that may be associated with a successful LBT.

In some examples of the method, apparatuses, and non-transitory computer-readable medium described herein, receiving the feedback associated with the transmission over the one or more feedback channel occasions of the set of multiple feedback channel occasions may include operations, features, means, or instructions for receiving the feedback over each feedback channel occasion of the set of multiple feedback channel occasions that may be associated with a successful LBT.

In some examples of the method, apparatuses, and non-transitory computer-readable medium described herein, receiving the feedback associated with the transmission over the one or more feedback channel occasions of the set of multiple feedback channel occasions may include operations, features, means, or instructions for receiving the feedback over a first feedback channel occasion within a same COT of the transmission based on a cyclic prefix extension.

DETAILED DESCRIPTION

Figure 1:
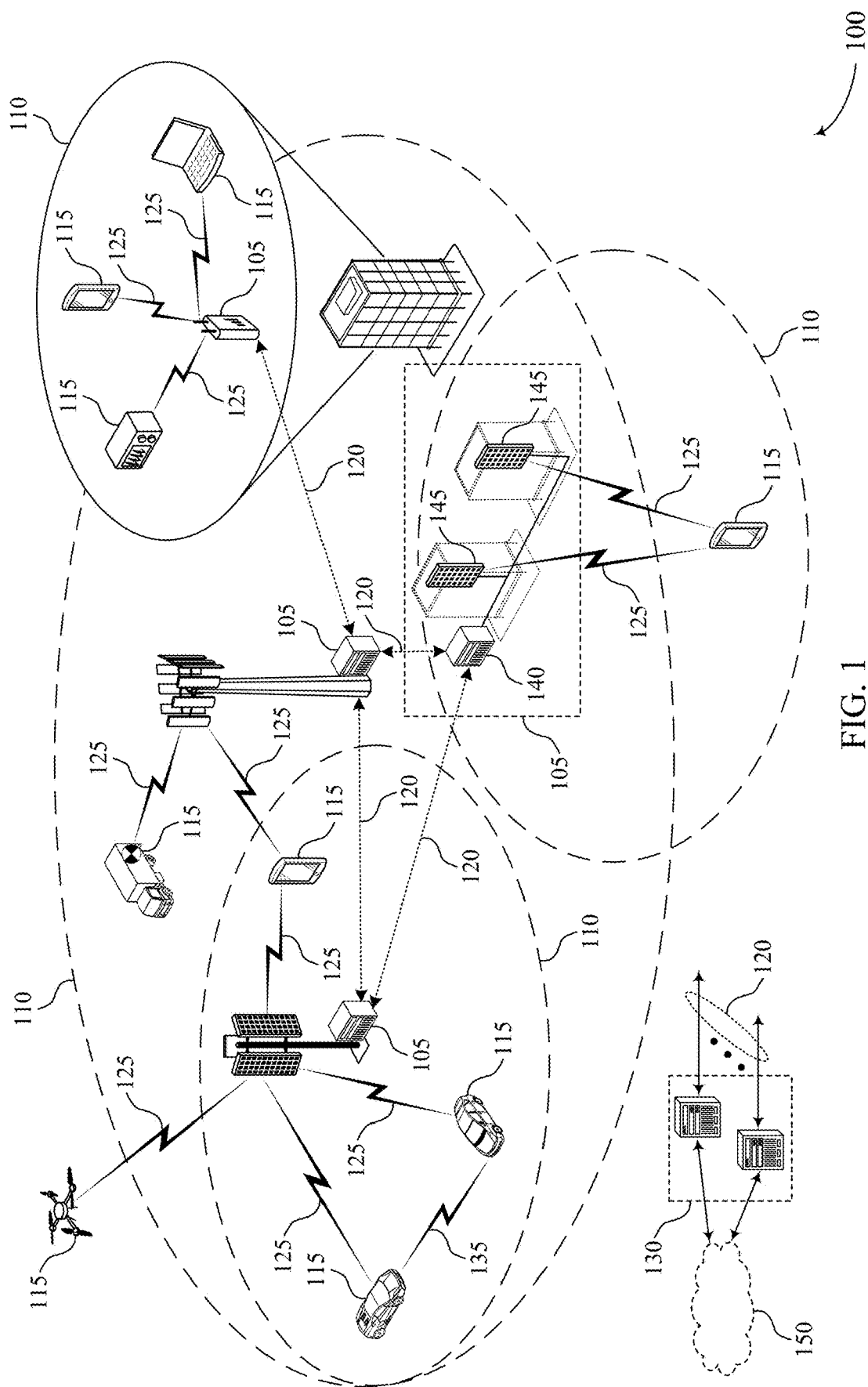
FIGS. 1 and 2 illustrate examples of wireless communications systems that support techniques for configuring multiple frequency domain opportunities for sidelink feedback in accordance with various aspects of the present disclosure.

In some wireless communications systems, two or more user equipment (UEs) may communicate with each other via one or more sidelink channels. For example, a first UE may transmit to a second UE over a sidelink data channel, such as a physical sidelink shared channel (PSSCH), and, in some cases, the second UE may transmit feedback to the first UE responsive to the transmission over the sidelink data channel over a sidelink feedback channel, such as a physical sidelink feedback channel (PSFCH). In some cases, the second UE may provide the feedback, which may include hybrid automatic repeat request (HARQ) feedback, to the first UE responsive to the transmission over the sidelink data channel to support higher reliability of sidelink communication between the first UE and the second UE. For instance, based on receiving feedback indicating whether or not the second UE successfully received the transmission from the first UE, the first UE may determine whether or not to send a re-transmission to the second UE.

In some cases, a set of PSFCH resources (e.g., a PSFCH opportunity) over which the second UE may transmit the feedback to the first UE may be pre-determined or pre-configured based on a mapping or an assignment between the PSSCH resources over which the first UE transmits to the second UE and PSFCH resources. In other words, each PSSCH resource may be associated with a unique PSFCH opportunity. In some cases, the second UE may transmit the feedback over the PSFCH opportunity associated with the PSSCH over which the first UE transmits to the second UE without contention or competition from other devices (e.g., other UEs also transmitting feedback). In some other cases, however, the PSFCH opportunity over which the second UE may transmit the feedback to the first UE may be part of an unlicensed radio frequency spectrum band and, as such, the second UE may perform listen-before-talk (LBT), such as an LBT procedure or a channel access procedure, prior to getting access to the PSFCH opportunity (and likewise prior to transmitting the feedback). In some examples, such as in examples in which there is high channel volume or traffic, LBT may have a relatively high likelihood of failure and, if LBT failure does occur, the second UE may be unable to transmit the feedback to the first UE over the associated PSFCH opportunity. As such, the first device may assume that the second device failed to receive the transmission and may transmit a re-transmission to the second UE, which may be unnecessary (e.g., the second UE may have failed to provide the feedback based on an LBT failure rather than a reception failure).

In some implementations of the present disclosure, the second UE may receive a configuration of multiple PSFCH opportunities over multiple sub-bands for transmitting feedback responsive to a transmission over a PSSCH over a sub-band. In some aspects, such different sub-bands may refer to different LBT sub-bands (e.g., a sub-band or frequency range over which a UE may perform LBT). Such a configuration of multiple PSFCH opportunities for a PSSCH or an LBT sub-band may increase the likelihood for at least one of the multiple PSFCH opportunities to be available (e.g., pass LBT) and the second UE may likewise have a greater likelihood to transmit the feedback to the first UE. For example, the configuration may indicate that a PSSCH of a first LBT sub-band is configured for multiple PSFCH opportunities including a first PSFCH opportunity in the first LBT sub-band and a second PSFCH opportunity in a second LBT sub-band different from the first LBT sub-band. In such examples, if the second UE receives a transmission from the first UE over the PSSCH of the first sub-band, the second UE may perform LBT for each of the first PSFCH opportunity in the first LBT sub-band and the second PSFCH opportunity in the second LBT sub-band and may transmit feedback to the first UE over the first PSFCH opportunity or the second PSFCH opportunity, or both, depending on the respective outcomes of the LBT procedures.

Aspects of the subject matter described in this disclosure can be implemented to realize one or more of the following potential advantages. The described techniques may be implemented to support more reliable transmission of HARQ feedback associated with sidelink communication over an unlicensed radio frequency spectrum band. For example, based on receiving a configuration of multiple PSFCH opportunities over which the second UE may transmit feedback to the first UE responsive to a transmission over an associated PSSCH or LBT sub-band, the likelihood for at least one of the multiple PSFCH opportunities to pass LBT may increase based on the separation of the multiple PSFCH opportunities in different LBT sub-bands. Based on the greater likelihood of at least one of the multiple PSFCH opportunities to pass LBT, the second UE may likewise have a greater likelihood of transmitting feedback to the first UE. As such, the first UE may more accurately determine whether the transmission was successfully received at the second UE and the first UE may avoid potentially unnecessary re-transmissions to the second UE. Accordingly, the first UE and the second UE may experience greater spectral efficiency, higher data rates, and increased capacity, among other benefits.

Aspects of the disclosure are initially described in the context of wireless communications systems. Aspects of the disclosure are additionally illustrated by and described with reference to resource configurations and a process flow. Aspects of the disclosure are further illustrated by and described with reference to apparatus diagrams, system diagrams, and flowcharts that relate to techniques for configuring multiple frequency domain opportunities for sidelink feedback.

FIG. 1 illustrates an example of a wireless communications system 100 that supports techniques for configuring multiple frequency domain opportunities for sidelink feedback in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier (ID) for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE unlicensed radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications between two or more UEs 115 over a communication link 135. For example, a first UE 115 may transmit to a second UE 115 over a sidelink data channel, such as a PSSCH. In some cases, the second UE 115 may transmit feedback to the first UE 115 responsive to the transmission over the sidelink data channel over a sidelink feedback channel, such as a PSFCH. Such transmission of feedback, which may include HARQ acknowledgement (ACK) or negative ACK (NACK) feedback, responsive to the transmission over the sidelink data channel may support higher reliability of sidelink communication between the first UE 115 and the second UE 115. For instance, based on receiving feedback indicating whether or not the second UE 115 successfully received the transmission from the first UE 115, the first UE 115 may determine whether or not to send a re-transmission to the second UE 115.

In some cases, the second UE 115 may transmit feedback over a PSFCH opportunity (e.g., a set of time and frequency resources of a PSFCH) responsive to the transmission from the first UE 115 according to a mapping or an assignment between the PSSCH over which the first UE 115 transmitted to the second UE 115 and the PSFCH opportunity. In other words, each PSSCH resource may be associated with a unique PSFCH opportunity (e.g., there is a one-to-one mapping between a PSSCH resource and a corresponding PSFCH opportunity). In such cases, the second UE 115 may transmit the feedback over the PSFCH opportunity corresponding to the PSSCH over which the first UE 115 transmits to the second UE 115 without contention or competition from other devices (e.g., other UEs 115 also transmitting feedback). Accordingly, such a mapping or an assignment between a PSSCH and a PSFCH opportunity may be configured within a licensed radio frequency spectrum band. In some other cases, however, the PSFCH opportunity over which the second UE 115 may transmit the feedback to the first UE 115 may be part of an unlicensed radio frequency spectrum band and, as such, the second UE 115 may perform LBT, such as an LBT procedure or a channel access procedure, prior to getting access to the PSFCH opportunity (and likewise prior to transmitting the feedback to the first UE 115).

In some examples, such as in examples in which there is high channel volume or traffic, LBT may have a relatively high likelihood of failure and, if LBT failure does occur, the second UE 115 may be unable to transmit the feedback to the first UE 115 over the PSFCH opportunity corresponding to the PSSCH over which the first UE 115 transmits to the second UE 115. In examples in which LBT failure does occur, the first UE 115, upon failing to receive feedback from the second UE 115, may determine or otherwise assume that the second UE 115 failed to successfully receive the transmission over the PSSCH and the first UE 115 may transmit a re-transmission to the second UE 115. In examples in which the second UE 115 was able to successfully receive the transmission, but unable to transmit the feedback due to an LBT failure, such a re-transmission may be unnecessary. Additionally, in examples in which the second UE 115 experiences continuous (e.g., multiple, or greater than a threshold number) of LBT failures for sending feedback to the first UE 115, the first UE 115 or the second UE 115, or both, may declare or otherwise trigger radio link failure (RLF), which may result in a loss of connectivity between the first UE 115 and the second UE 115.

In some implementations of the present disclosure, the second UE 115 may receive a configuration of multiple PSFCH opportunities over multiple LBT sub-bands for transmitting feedback responsive to a transmission over a PSSCH in an LBT sub-band. Such a configuration of multiple PSFCH opportunities over multiple sub-bands for a PSSCH or an LBT sub-band may increase the likelihood for at least one of the multiple PSFCH opportunities to be available for carrying feedback from the second UE 115 to the first UE 115. For example, the configuration may indicate that a PSSCH of a first sub-band is configured for multiple PSFCH opportunities including a first PSFCH opportunity in the first LBT sub-band and a second PSFCH opportunity in a second LBT sub-band different from the first LBT sub-band. In such examples, if the second UE 115 receives a transmission from the first UE 115 over the PSSCH of the first sub-band, the second UE 115 may perform LBT for each of the first PSFCH opportunity in the first LBT sub-band and the second PSFCH opportunity in the second LBT sub-band and may transmit feedback to the first UE 115 over the first PSFCH opportunity or the second PSFCH opportunity, or both, depending on the respective outcomes of the LBT procedures.

Figure 2:
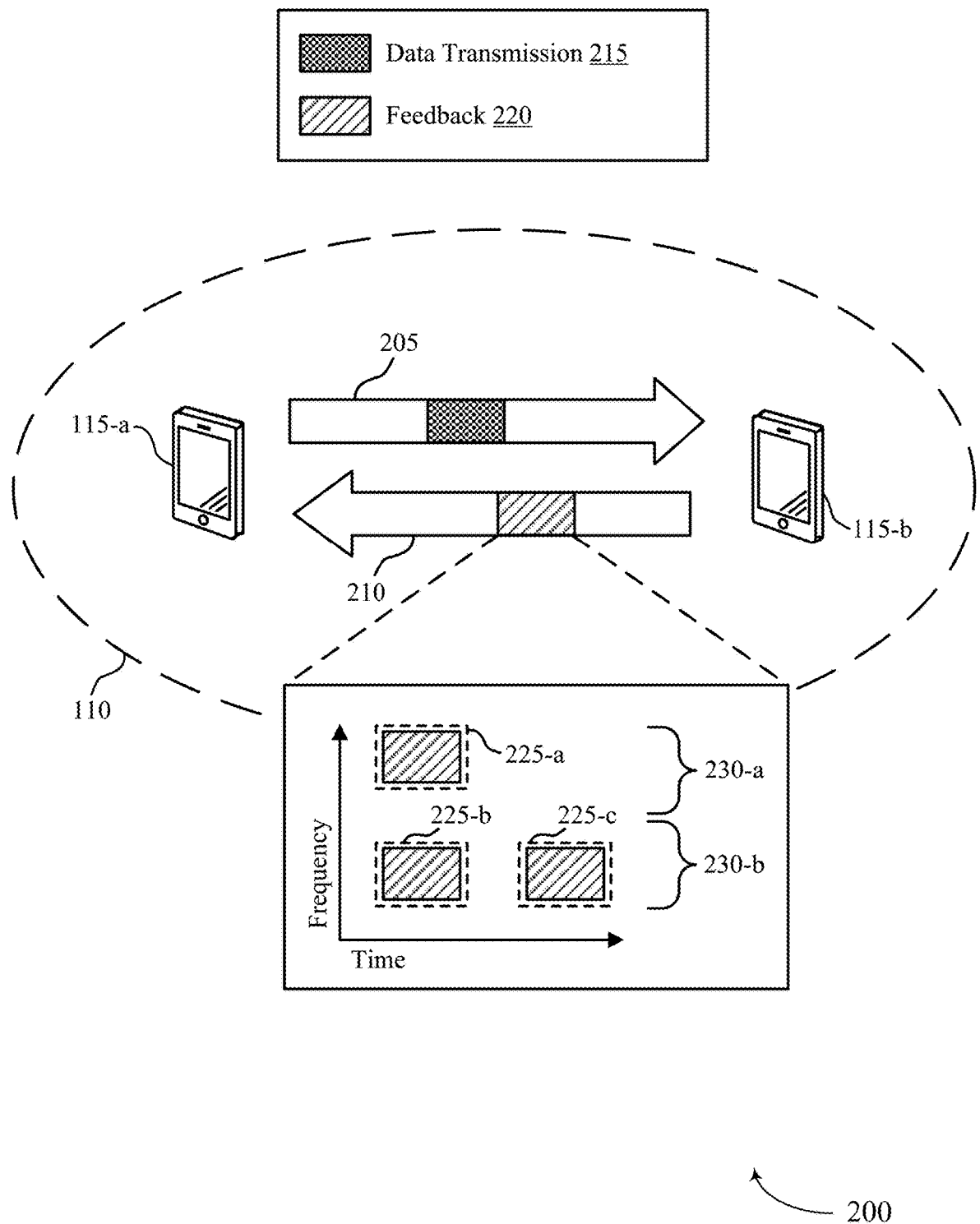

FIG. 2 illustrates an example of a wireless communications system 200 that supports techniques for configuring multiple frequency domain opportunities for sidelink feedback in accordance with various aspects of the present disclosure. The wireless communications system 200 illustrates communication between a UE 115-*a* and a UE 115-*b*, which may be examples of corresponding devices described herein, including UEs 115 as described with reference to FIG. 1. In some aspects, the UE 115-*a* and the UE 115-*b* may communicate within a geographic coverage area 110-*a* and communicate with each other via a communication link 205 and a communication link 210. In some implementations, the UE 115-*b* may receive a configuration of multiple PSFCH opportunities 225 over multiple LBT sub-bands 230 corresponding to a PSSCH or an LBT sub-band including the PSSCH for transmitting feedback 220 responsive to a data transmission 215 over the PSSCH.

The wireless communications system 200, which may be an example of an NR system supporting NR sidelink communication, such as V2X communication, may support the transmission of feedback (such as HARQ feedback) over a PSFCH for higher reliability for both unicast and groupcast transmissions. For example, the UE 115-*a* or the UE 115-*b*, or both, may transmit a HARQ response (such as an ACK or a NACK) over a PSFCH opportunity 225 responsive to sidelink communication between the UE 115-*a* and the UE 115-*b*, and the PSFCH may be arranged or otherwise configured as a global resource pool with pre-determined (e.g., pre-configured) mappings or assignments. In other words, in some cases, there may be a unique PSFCH opportunity 225 for one PSSCH. Such examples in which there may be a unique PSFCH opportunity 225 for one PSSCH may include examples of unicast HARQ response (such that one UE 115 receives a data transmission 215 and transmits feedback 220 responsive to the data transmission 215) and examples of groupcast HARQ response option 2 (such that multiple UEs 115 receive a data transmission 215 and each transmit feedback 220 responsive to the data transmission 215).

In such examples in which one PSFCH opportunity 225 is mapped or assigned to one PSSCH and in which the UE 115-*a* transmits a data transmission 215 to the UE 115-*b* over a PSSCH, the UE 115-*b* may determine the PSFCH opportunity 225 that is mapped or assigned to the PSSCH over which the UE 115-*a* transmits the data transmission 215, and the UE 115-*b* may transmit feedback 220 responsive to the data transmission 215 over the PSFCH opportunity 225 accordingly. In some cases, such a mapping or assignment may be pre-configured for each PSSCH resource over which a UE 115 may transmit. As such, the UE 115-*b* may transmit feedback 220 to the UE 115-*a* in a contention-free manner (e.g., without competition from other UEs 115). In other words, the UE 115-*a* and the UE 115-*b* may communicate over a licensed radio frequency spectrum band or an ITS radio frequency spectrum band.

For example, each PSSCH over which the UE 115-*a* or the UE 115-*b* may transmit may be mapped to a different PSFCH opportunity 225, and each different PSFCH opportunity 225 may correspond to a different set of physical resource blocks (PRBs) in a symbol period, such as a PSFCH symbol period. In some cases, each set of PRBs in the PSFCH symbol period may include a quantity of Z PRBs (and Z may be configurable). In some aspects, a sidelink data channel may include a number of discrete PSSCHs (e.g., discrete sets of resources within a PSSCH) over which a UE 115 may transmit and the number of PSSCHs may be located in different time or frequency resources. For example, a sidelink data channel may include N PSSCHs over an interval in time and S PSSCHs over a range in frequency. As such, a PSFCH resource pool (which may include a number of PSFCH opportunities 225) may include $N_F = Z \ast S \ast N$ PRBs. In some cases, the $N_F$ PRBs of the PSFCH resource pool may be indicated (to the UE 115-*a* or the UE 115-*b*, or both) by a PRB-level bit-map via control signaling, such as layer 3 (L3) signaling. In some aspects, N=2.

Each PSFCH opportunity 225 (e.g., each Z-PRB) may carry Z*Y PSFCH sequences, where Y is a cyclic shift value of the PSFCH opportunity 225 and may be a value in the set of numbers {1, 2, 3, 4, 6} representing the number of cyclic shifts (e.g., a dimension in the code-domain) that the UE 115-*b* may use for transmitting over the PSFCH opportunity 225. The UE 115-*b* (e.g., the receiver UE) may choose or select a sequence with an index of (K+M)mod(Z*Y) for transmitting over one of the Z PRBs corresponding to the (leading) sub-channel of the PSSCH. In some cases, K is the transmitting UE ID (e.g., and may be 8 bits) in PSSCH. For instance, K may refer to the UE ID of the UE 115-*a*. M may vary depending on whether the PSSCH carries a unicast transmission or a groupcast transmission. For instance, in examples in which the PSSCH carries a unicast transmission, M is set to 0. Alternatively, in examples in which the PSSCH carries a groupcast transmission (e.g., a groupcast transmission requesting groupcast HARQ response option 2), M is set to a group ID which may be a number in the range of numbers {0, 1, . . . , X−1} where X is equal to a quantity of UEs 115 receiving the groupcast transmission and requested for groupcast HARQ. In some cases, groupcast HARQ response option 2 is not used for X>Z*Y.

In some cases, however, a licensed radio frequency spectrum band or an ITS radio frequency spectrum band may be unavailable (or not guaranteed) in some regions. For example, the wireless communications system 200 may not always or everywhere support the use of licensed radio frequency spectrum bands and, in some cases, the UE 115-*a* and the UE 115-*b* may communicate over an unlicensed radio frequency spectrum band. In such cases in which the UE 115-*a* and the UE 115-*b* communicate over an unlicensed radio frequency spectrum band, the UE 115-*a* and the UE 115-*b* may perform LBT (e.g., an LBT procedure or a channel access procedure) prior to transmitting to support coexistence with other radio access technologies (RATs). In some aspects, the UE 115-*a* and the UE 115-*b* may perform LBT by regulation in some 5 GHz unlicensed radio frequency spectrum bands (e.g., in some of the most relevant 5 GHz unlicensed radio frequency spectrum bands).

In such cases in which the UE 115-*a* and the UE 115-*b* communicate over an unlicensed radio frequency spectrum band and perform LBT prior to transmitting, the UE 115-*b* may perform LBT prior to transmitting feedback 220 (e.g., a HARQ response) over the PSFCH opportunity 225 corresponding to the PSSCH over which the UE 115-*a* transmits the data transmission 215. In some cases, however, the PSFCH opportunity 225 (e.g., a unique PSFCH opportunity for the PSSCH carrying the data transmission 215) may be occupied or otherwise unavailable such that the LBT for the PSFCH opportunity 225 may fail. As such, the UE 115-*b* may be unable to get channel access for the PSFCH opportunity 225 and may likewise be unable to transmit the feedback 220 to the UE 115-*a* over the PSFCH opportunity 225. The UE 115-*a*, failing to receive the feedback 220 from the UE 115-*b* over the PSFCH opportunity 225 corresponding to (e.g., mapped or assigned to) the PSSCH carrying the data transmission 215, may determine or otherwise assume that the UE 115-*b* failed to successfully receive the data transmission 215. The UE 115-*a* may accordingly re-transmit the data transmission 215 to the UE 115-*b* over a second PSSCH, which may be unnecessary in cases in which the UE 115-*b* successfully received the initial data transmission 215 and experienced an LBT failure when attempting to transmit the associated feedback 220. Such unnecessary re-transmission may result in poor spectral efficiency, increased interference, higher processing costs, or a combination thereof.

The UE 115-*b*, based on receiving the re-transmission of the data transmission 215 over the second PSSCH, may identify a second PSFCH opportunity 225 corresponding to the second PSSCH and perform a second LBT procedure on the second PSFCH opportunity 225 prior to transmitting the feedback 220 to the UE 115-*a*. In some cases, however, the second LBT procedure may fail and the UE 115-*b* may again refrain from transmitting the feedback 220 associated with the data transmission 215 to the UE 115-*a*. In cases of continuous LBT failure (and likewise continuous failures for sending a HARQ response), the UE 115-*a* or the UE 115-*b*, or both, may declare RLF. In other words, continuous failure to send feedback 220 to the UE 115-*a* responsive to the data transmission 215 may trigger or otherwise result in an RLF event.

In some implementations of the present disclosure, the UE 115-*b* may receive a configuration of multiple PSFCH opportunities 225, such as a PSFCH opportunity 225-*a*, a PSFCH opportunity 225-*b*, and a PSFCH opportunity 225-*c*, over multiple LBT sub-bands 230, such as over an LBT sub-band 230-*a* and an LBT sub-band 230-*b*, for a PSSCH or an LBT sub-band carrying the PSSCH. In other words, one PSSCH over which the UE 115-*a* may transmit the data transmission 215 to the UE 115-*b* (and that requests HARQ response) may correspond to multiple PSFCH opportunities 225 over multiple LBT sub-bands 230 over which the UE 115-*b* may potentially transmit the feedback 220 associated with the data transmission 215. Additionally, in some implementations, the multiple PSFCH opportunities 225 may be configured over multiple time periods, such as in multiple slots or in multiple PSFCH symbols (as illustrated by and described in more detail with reference to FIG. 3).

For example, the UE 115-*a* may transmit the data transmission 215 over a PSSCH that corresponds to multiple PSFCH opportunities 225 including the PSFCH opportunity 225-*a* located in the LBT sub-band 230-*a* and in a first PSFCH symbol, the PSFCH opportunity 225-*b* located in the LBT sub-band 230-*b* and in the first PSFCH symbol, and the PSFCH opportunity 225-*c* located in the LBT sub-band 230-*b* and in a second PSFCH symbol. As such, the UE 115-*b* may perform an LBT procedure for each of the PSFCH opportunities 225 to determine which of the multiple PSFCH opportunities 225 are available (e.g., which of the multiple PSFCH opportunities 225 pass LBT). In some examples, the UE 115-*a* may determine that one or more of the multiple PSFCH opportunities 225 are available (e.g., pass LBT) and may transmit the feedback 220 associated with the data transmission 215 over at least one of the one or more PSFCH opportunities 225 that are available.

The UE 115-*b* may implement various techniques to determine over which PSFCH opportunities 225 of the available PSFCH opportunities 225 to transmit the feedback 220, and the UE 115-*b* may follow one or more of the various techniques based on a pre-configuration, a UE decision, or control signaling. For example, depending on the implementation or configuration at the UE 115-*b*, the UE 115-*b* may transmit over all available PSFCH opportunities 225 or a subset of the available PSFCH opportunities 225. Additional details relating to over which of the available PSFCH opportunities 225 the UE 115-*b* may transmit are described herein, including with reference to FIG. 3.

In some aspects, an LBT sub-band 230 may refer to or include a bandwidth (in frequency) over which the UE 115-*b* may conduct LBT. For instance, in examples in which the UE 115-*a* and the UE 115-*b* communicate over the 5 GHz unlicensed radio frequency spectrum band, an LBT sub-band 230 may refer to or include a 20 MHz frequency range. Alternatively, in some other examples (such as in examples supporting coexistence with dedicated short-range communication (DSRC) technology), an LBT sub-band 230 may refer to or include a 10 MHz frequency range.

The UE 115-*b* may receive a control message including a configuration of the multiple PSFCH opportunities 225. In some aspects, the UE 115-*b* may receive the control message from the UE 115-*a* via higher layer signaling (e.g., L3 signaling) or sidelink control information (SCI). In some other aspects, the UE 115-*b* may receive the control message from a serving base station 105 (as described with reference to FIG. 1) via higher layer signaling (e.g., L3 signaling). In some examples, the control message may configure multiple PSFCH resource pools (where each PSFCH resource pool may include multiple PSFCH opportunities 225). For example, the control message may configure one PSFCH resource pool per LBT sub-band 230. Additional details relating to how the control message may configure multiple PSFCH opportunities 225 over multiple PSFCH resource pools are described herein, including with reference to FIGS. 4 and 5.

In some other examples, the control message may configure a single PSFCH resource pool. For example, the control message may configure one PSFCH resource pool for both the LBT sub-band 230-*a* and the LBT sub-band 230-*b* (such that the one PSFCH resource pool includes the PSFCH opportunity 225-*a*, the PSFCH opportunity 225-*b*, and the PSFCH opportunity 225-*c*). In such examples, the control message may provide a one-PSSCH-to-multiple-PSFCH-opportunities mapping such that each of the multiple PSFCH opportunities 225 mapped to a PSSCH are distributed over different LBT sub-bands 230 (but within the same PSFCH resource pool). Additional details relating to how the control message may configure multiple PSFCH opportunities 225 within one PSFCH resource pool are described herein, including with reference to FIG. 6.

In some implementations, the UE 115-*a* and the UE 115-*b* may coordinate on which of the multiple PSFCH opportunities 225 the UE 115-*b* may use to transmit the feedback 220 via sidelink control signaling, such as SCI. For example, the UE 115-*a* may transmit SCI to the UE 115-*b* to control how the UE 115-*b* uses the multiple PSFCH opportunities 225 associated with the PSSCH over which the UE 115-*a* transmits the data transmission 215. In some examples, the UE 115-*a* may transmit the SCI including a control field to dynamically pick or otherwise select a subset of the multiple PSFCH opportunities 225 applicable for the data transmission 215 (e.g., the multiple PSFCH opportunities 225 mapped or assigned to the PSSCH over which the UE 115-*a* transmits the data transmission 215). For example, the PSSCH over which the UE 115-*a* transmits the data transmission 215 may be mapped or assigned to the PSFCH opportunity 225-*a*, the PSFCH opportunity 225-*b*, and the PSFCH opportunity 225-*c*, and the UE 115-*a* may sub-select one or more of the PSFCH opportunity 225-*a*, the PSFCH opportunity 225-*b*, or the PSFCH opportunity 225-*c* via the control field in the SCI. In such examples, the UE 115-*a* may perform LBT for the PSFCH opportunities 225 that are sub-selected by the SCI or may otherwise refrain from transmitting the feedback 220 over PSFCH opportunities 225 that are not sub-selected by the SCI (e.g., the UE 115-*b* may transmit the feedback 220 over PSFCH opportunities 225 that are sub-selected by the SCI). Additional details relating to such a sub-selecting SCI control field are described herein, including with reference to FIG. 3.

The wireless communications system 200, based on supporting a one-to-many mapping between a PSSCH and PSFCH opportunities 225 over multiple LBT sub-bands 230, may allow a receiving UE 115, such as the UE 115-*b*, to fill a gap (e.g., a time gap) between a PSSCH and a PSFCH with a cyclic prefix (CP) extension such that the receiving UE 115 may transmit feedback 220 within a same channel occupancy time (COT) of the PSSCH. For example, although such a CP extension to fill the time gap between a PSSCH and a PSFCH may cause LBT procedures for a PSFCH opportunity 225 within the PSFCH and in the same LBT sub-band as the CP extension to fail, the configuration of multiple PSFCH opportunities 225 for each PSSCH may provide sufficient opportunities for other, potentially blocked UEs 115 to still transmit feedback 220. Additional details relating to such use of a CP extension to transmit feedback 220 within a system supporting multiple PSFCH opportunities 225 over multiple LBT sub-bands 230 are described herein, including with reference to FIG. 7.

Additionally, the techniques of the present disclosure can be implemented with or without multiple time-domain PSFCH opportunities 225 (such as multiple time-domain PSFCH opportunities 225 via different HARQ timelines). Such different HARQ timelines may be defined such that one PSSCH has more than one PSFCH opportunity 225 in the time-domain. In some implementations, the multiple time-domain PSFCH opportunities 225 may be accommodated by configuring different PSFCH resource sets for different timelines. In some other implementations, the multiple time-domain PSFCH opportunities 225 may be accommodated by splitting a PSFCH resource set into static and orthogonal sub-sets. In such implementations, for example, odd indices may be configured for a first HARQ timeline and even indices may be configured for a second HARQ timeline.

As such, the UE 115-*b* may have a greater likelihood of successfully identifying an available PSFCH opportunity and likewise of transmitting the feedback 220 associated with the data transmission 215 to the UE 115-*a*. Likewise, the UE 115-*a* may have a greater likelihood of receiving the feedback 220 from the UE 115-*b*, which may result in fewer potentially unnecessary re-transmissions of the data transmission 215 and reduce the likelihood of any of the UE 115-*a* or the UE 115-*b*, or both, declaring RLF. Accordingly, the UE 115-*a* and the UE 115-*b* may achieve greater spectral efficiency, higher data rates, improve system capacity, and reduce interference.

Figure 3:
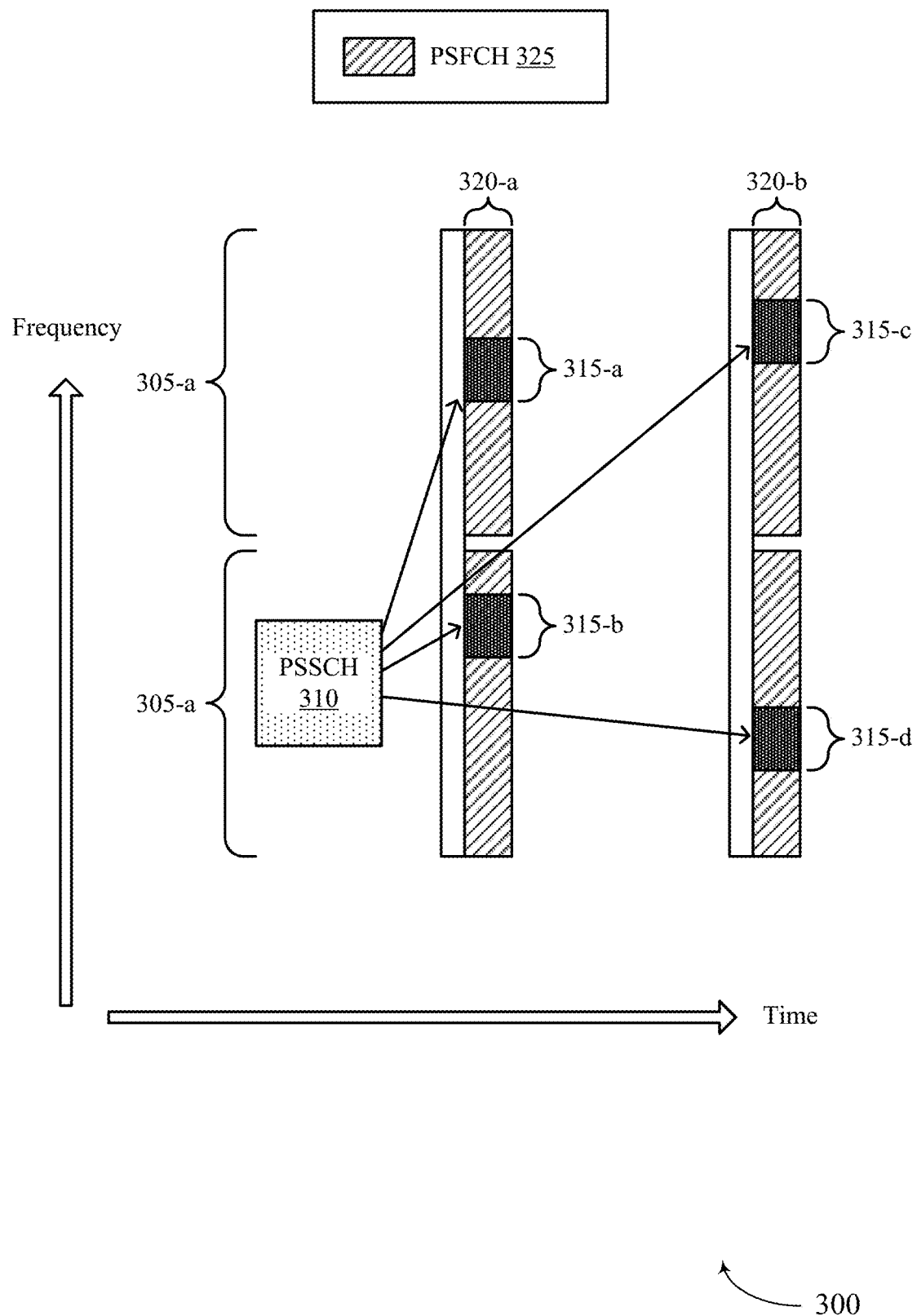
FIGS. 3 through 7 illustrate examples of resource configurations that support techniques for configuring multiple frequency domain opportunities for sidelink feedback in accordance with various aspects of the present disclosure.

FIG. 3 illustrates an example of a resource configuration 300 that supports techniques for configuring multiple frequency domain opportunities for sidelink feedback in accordance with various aspects of the present disclosure. The resource configuration 300 may be implemented to realize aspects of the wireless communications system 100 or the wireless communications system 200. For example, a first UE 115 may transmit a data transmission to a second UE 115, which may be examples of corresponding devices described herein, over a PSSCH 310 and the second UE 115 may transmit feedback associated with the data transmission to the first UE 115 over one or more of multiple PSFCH opportunities 315 in a PSFCH 325 corresponding to the PSSCH 310. In some implementations, the second UE 115 may receive a control message including a configuration of the multiple PSFCH opportunities 315 corresponding to the PSSCH 310 and the second UE 115 may perform an LBT procedure for each of the multiple PSFCH opportunities 315 to determine which of the multiple PSFCH opportunities 315 are available for transmitting feedback.

For example, the second UE 115 may receive, from the first UE 115 or from a serving base station 105, a control message configuring the multiple PSFCH opportunities 315 over multiple LBT sub-bands 305 for a PSSCH 310 over which the first UE 115 transmits data (e.g., data that may request feedback) to the second UE 115. As shown in FIG. 3, the second UE 115 may receive a configuration of four PSFCH opportunities 315 over two LBT sub-bands 305 and in two PSFCH symbols 320. For instance, the control message may configure, for the PSSCH 310, a PSFCH opportunity 315-*a* in an LBT sub-band 305-*a* and in a PSFCH symbol 320-*a*, a PSFCH opportunity 315-*b* in an LBT sub-band 305-*b* and in the PSFCH symbol 320-*a*, a PSFCH opportunity 315-*c* in the LBT sub-band 305-*a* and in a PSFCH symbol 320-*b*, and a PSFCH opportunity 315-*d* in the LBT sub-band 305-*b* and in the PSFCH symbol 320-*b*. As such, FIG. 3 illustrates an example in which the multiple PSFCH opportunities 315 span multiple LBT sub-bands 305 and multiple PSFCH symbols 320. Further, although FIG. 3 illustrates four PSFCH opportunities 315 (which may achieve up to four LBT diversity order), the second UE 115 may receive a configuration of any number of PSFCH opportunities 315 for the PSSCH 310 without exceeding the scope of the present disclosure.

In some implementations of the present disclosure, the second UE 115, based on receiving a transmission from the first UE 115 over the PSSCH 310, may perform LBT (e.g., an LBT procedure or a channel access procedure) for each of the multiple PSFCH opportunities 315 corresponding to the PSSCH 310 to determine which of the multiple PSFCH opportunities 315 are available for transmitting feedback associated with the transmission to the first UE 115. In some examples, the second UE 115 may determine one or more available PSFCH opportunities 315 based on performing a successful LBT procedure for one or more of the multiple PSFCH opportunities 315, and may transmit feedback to the first UE 115 over the one or more available PSFCH opportunities 315.

In some examples, the second UE 115 may condition over which of the available PSFCH opportunities 315 the second UE 115 transmits feedback based on a pre-configuration, a UE decision, or control signaling. In some implementations, for instance, the second UE 115 (a HARQ responder) may transmit feedback over all of the available PSFCH opportunities 315. In such implementations, the second UE 115 may employ power splitting (e.g., in examples in which two or more of the available PSFCH opportunities 315 occupy a same PSFCH symbol 320). For example, if the PSFCH opportunity 315-*a* and the PSFCH opportunity 315-*b* both pass LBT, the second UE 115 may employ power splitting to transmit feedback over both the PSFCH opportunity 315-*a* and the PSFCH opportunity 315-*b* simultaneously (such that the second UE 115 avoids exceeding a power limit of the second UE 115).

In some other implementations, the second UE 115 may transmit over all available PSFCH opportunities 315 that are located in an earliest PSFCH symbol 320. In an example, if the PSFCH opportunity 315-*a* and the PSFCH opportunity 315-*c* pass LBT, the second UE 115 may transmit feedback over the PSFCH opportunity 315-*a* and may refrain from transmitting feedback over the PSFCH opportunity 315-*c* (e.g., because the PSFCH opportunity 315-*c* is located in a later PSFCH symbol 320-*b* than the PSFCH symbol 320-*a* in which the PSFCH opportunity 315-*a* is located). Similarly, if the PSFCH opportunity 315-*a*, the PSFCH opportunity 315-*b*, and the PSFCH opportunity 315-*c* pass LBT, the second UE 115 may transmit feedback over both of the PSFCH opportunity 315-*a* and the PSFCH opportunity 315-*b*, and may refrain from transmitting feedback over the PSFCH opportunity 315-*c* (e.g., because the PSFCH opportunity 315-*c* is located in a later PSFCH symbol 320-*b* than the PSFCH symbol 320-*a* in which the PSFCH opportunity 315-*a* and the PSFCH opportunity 315-*b* are located).

In some other implementations, the second UE 115 may transmit feedback over a primary PSFCH opportunity if it is available, otherwise the second UE 115 may choose (e.g., randomly choose) to transmit feedback over one secondary PSFCH opportunity. In such implementations, the second UE 115 may receive a configuration indicating one of the multiple PSFCH opportunities 315 as the primary PSFCH opportunity and indicating a remainder of the multiple PSFCH opportunities 315 as secondary PSFCH opportunities. For instance, in examples in which the PSFCH opportunity 315-*a* is configured as the primary PSFCH opportunity and in which the PSFCH opportunity 315-*a* and the PSFCH opportunity 315-*b* (which may be a secondary PSFCH opportunity) pass LBT, the second UE 115 may transmit feedback over the PSFCH opportunity 315-*a* and may refrain from transmitting feedback over the PSFCH opportunity 315-*b*.

Alternatively, in examples in which the PSFCH opportunity 315-*a* is the primary PSFCH opportunity, in which the PSFCH opportunity 315-*a* fails LBT, and in which the PSFCH opportunity 315-*b* and the PSFCH opportunity 315-*c* (which may both be secondary PSFCH opportunities) pass LBT, the second UE 115 may transmit feedback over one of the PSFCH opportunity 315-*b* or the PSFCH opportunity 315-*c* (e.g., randomly or based on a UE decision). In some aspects, the configuration indicating the primary and secondary PSFCH opportunities may be the same configuration that maps or assigns the multiple PSFCH opportunities 315 to the PSSCH 310. In some other aspects, the configuration indicating the primary and secondary PSFCH opportunities may be a separate configuration.

In some other implementations, the second UE 115 may transmit feedback over a PSFCH opportunity 315 that is first in order of the available PSFCH opportunities 315. In other words, the second UE 115 may transmit feedback over a PSFCH opportunity 315 that has a highest priority of the available PSFCH opportunities 315 that passed LBT. For example, the second UE 115 may receive a configuration indicating an order or a priority of the multiple PSFCH opportunities 315 and the second UE 115 may transmit feedback over the PSFCH opportunity 315 highest in the order (or that has the highest priority) of the available PSFCH opportunities 315. For instance, in examples in which the PSFCH opportunity 315-*a* and the PSFCH opportunity 315-*b* pass LBT and in which the PSFCH opportunity 315-*a* is higher in the order (or has a higher priority) than the PSFCH opportunity 315-*b*, the second UE 115 may transmit feedback over the PSFCH opportunity 315-*a* and refrain from transmitting feedback over the PSFCH opportunity 315-*b*. In some aspects, the configuration indicating the order or priority of the PSFCH opportunities 315 may be the same configuration that maps or assigns the multiple PSFCH opportunities 315 to the PSSCH 310. In some other aspects, the configuration indicating the order or the priority of the PSFCH opportunities 315 may be a separate configuration.

In some other implementations, the second UE 115 may select any one or more of the available PSFCH opportunities 315. For example, the second UE 115 may randomly select any one or more of the available PSFCH opportunities 315 or may select any one or more of the available PSFCH opportunities 315 based on a UE decision. Further, although described in different implementations, the second UE 115 may use any combination of techniques for determining over which of the available PSFCH opportunities 315 to transmit feedback to the first UE 115. In some aspects, the second UE 115 may receive a configuration, such as an RRC configuration or a configuration via SCI, to select any one or more of the techniques for determining over which of the available PSFCH opportunities 315 to transmit feedback to the first UE 115.

In addition or as an alternative to conditioning over which of the available PSFCH opportunities 315 the second UE 115 transmits feedback based on a pre-configuration, a UE decision, or control signaling, the second UE 115 may receive, from the first UE 115, SCI including a control field that may dynamically indicate a subset of multiple PSFCH opportunities 315 for which the second UE 115 may perform LBT or over which the second UE 115 may transmit feedback to the first UE 115. In some examples, the control field of the SCI may indicate the subset of the PSFCH opportunities 315 (e.g., the PSFCH opportunities 315 that are L3 configured) based on indicating a time-domain subset of PSFCH opportunities 315 or a frequency-domain subset of PSFCH opportunities 315, or a combination thereof. For instance, in examples in which the control field indicates a time-domain subset of PSFCH opportunities 315, the SCI may sub-select PSFCH opportunities 315 within an indicated time-domain interval (such as PSFCH opportunities 315 within one or more PSFCH symbols 320). Additionally or alternatively, in examples in which the control field indicates a frequency-domain subset of PSFCH opportunities 315, the SCI may sub-select PSFCH opportunities 315 within an indicated frequency-domain range (such as PSFCH opportunities 315 within one or more LBT sub-bands 305).

For instance, in examples in which the control field indicates a time-domain subset of PSFCH opportunities 315, the control field may configure the second UE 115 to select PSFCH opportunities 315 within one or more PSFCH symbols 320. Additionally or alternatively, in examples in which the control field indicates a frequency-domain subset of PSFCH opportunities 315, the control field may configure the second UE 115 to select PSFCH opportunities 315 within one or more LBT sub-bands 305. Further, the control field may select PSFCH opportunities 315 that fall within a time-domain subset and a frequency domain subset of PSFCH opportunities 315. The control field of the SCI may include one or more bits, and the first UE 115 may construct the control field, and the second UE 115 may likewise interpret the control field, based on an RRC configuration. The RRC configuration may be signaled from the first UE 115 to the second UE 115, or vice-versa, or may be signaled to the first UE 115 and the second UE 115 from a serving base station 105. In some aspects, SCI may be referred to as layer 1 (L1) signaling. In some implementations, the control field may be constructed similarly to a physical uplink control channel (PUCCH) resource indicator (PRI) field in a Uu interface downlink grant.

As introduced with reference to FIG. 2, the configuration of multiple PSFCH opportunities 315 corresponding to a PSSCH 310 may configure multiple PSFCH resource pools (e.g., one PSFCH resource pool per LBT sub-band 305) or may configure a single PSFCH resource pool and introduce a one-PSSCH-to-multiple-PSFCH opportunities mapping such that the multiple PSFCH opportunities 315 corresponding to a PSSCH are distributed over multiple LBT sub-bands 305. Additional details relating to the configuration of multiple PSFCH resource pools are described with reference to FIGS. 4 and 5, and additional details relating to the configuration of one PSFCH resource pool, and the one-to-multiple mapping, are described with reference to FIG. 6.

Figure 4:
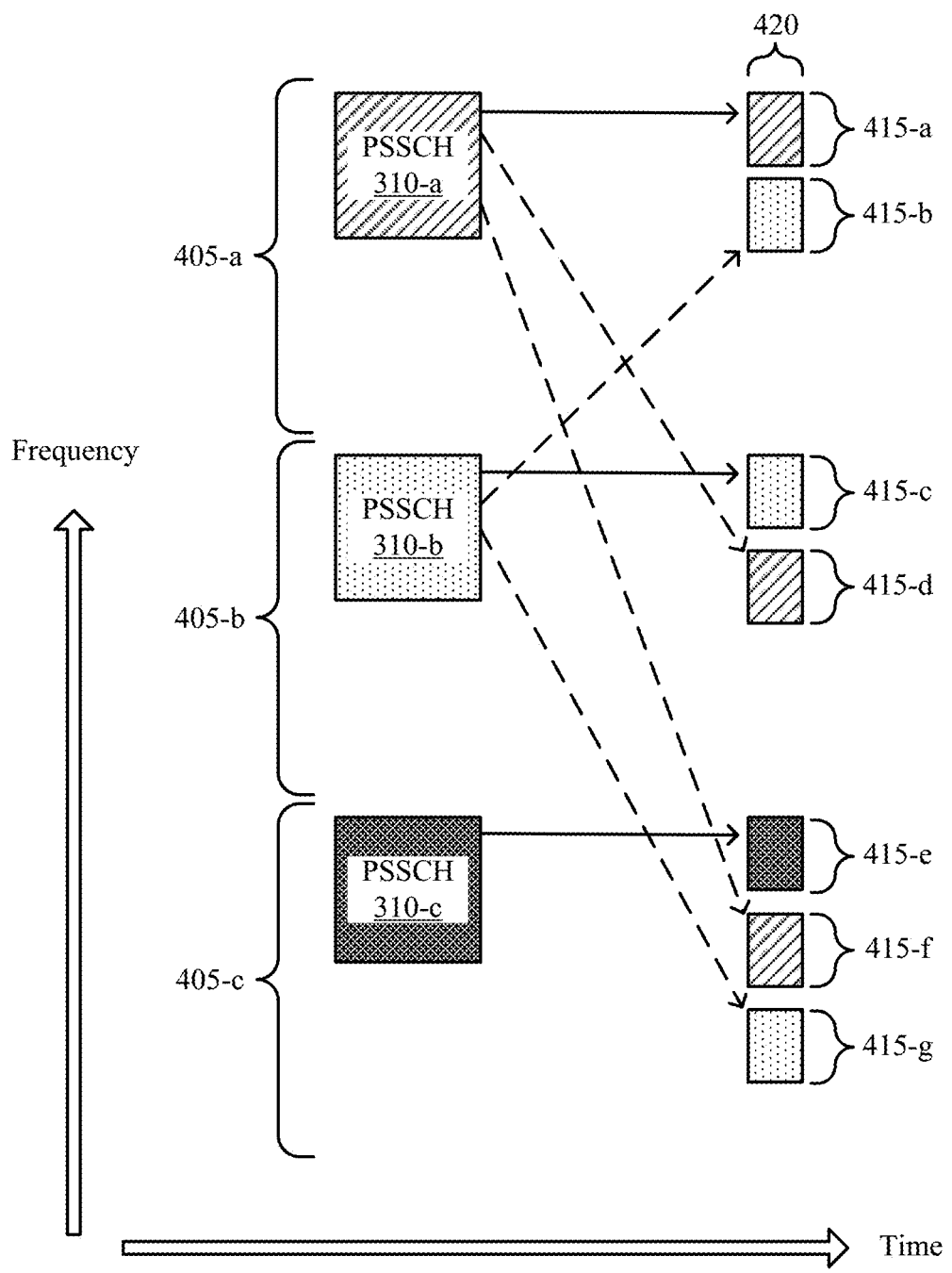

FIG. 4 illustrates an example of a resource configuration 400 that supports techniques for configuring multiple frequency domain opportunities for sidelink feedback in accordance with various aspects of the present disclosure. The resource configuration 400 may be implemented to realize aspects of the wireless communications system 100 or the wireless communications system 200. For example, a first UE 115 may transmit a data transmission to a second UE 115, which may be examples of corresponding devices described herein, over a PSSCH 410 and the second UE 115 may transmit feedback associated with the data transmission to the first UE 115 over one or more of multiple PSFCH opportunities 415 corresponding to the PSSCH 410. In some implementations, the second UE 115 may receive a configuration of multiple PSFCH resource pools. In some aspects, the second UE 115 may receive the configuration of the multiple PSFCH resource pools via higher layer signaling, such as via L3 signaling.

In some cases of a single PSFCH resource pool, as described in more detail with reference with FIG. 6, one PRB-level bit-map, together with Z and N (as described with reference to FIG. 2), may be sufficient to mark or otherwise indicate the PRBs for the single PSFCH resource pool. In cases of multiple PSFCH resource pools, the configuration may define or otherwise include a per LBT sub-band description. In other words, the configuration may indicate a PRB-level bit vector for each different LBT sub-band that marks out the PRBs of each of the PSFCH opportunities 415 in the PSFCH resource pool corresponding to that LBT sub-band. For example, for an LBT sub-band 405-a including a PSSCH 410-a, the configuration may indicate a first PRB-level bit vector indicating PRBs of the PSFCH opportunity 415-a, the PSFCH opportunity 415-d, and the PSFCH opportunity 415-f as the multiple PSFCH opportunities 415 over respective LBT sub-bands 405 (e.g., over the LBT sub-band 405-a, an LBT sub-band 405-b, and an LBT sub-band 405-c). Similarly, for the LBT sub-band 405-b including a PSSCH 410-a, the configuration may indicate a second PRB-level bit vector indicating PRBs of the PSFCH opportunity 415-c and the PSFCH opportunity 415-g. Likewise, for the LBT sub-band 405-c including a PSSCH 410-c, the configuration may indicate a third PRB-level bit vector indicating PRBs of the PSFCH opportunity 415-e.

As such, the configuration of the multiple PSFCH opportunities 415 may map or assign the LBT sub-band 405-a or the PSSCH 410-a to the PSFCH opportunity 415-a, the PSFCH opportunity 415-d, and the PSFCH opportunity 415-f, may map or assign the LBT sub-band 405-b or the PSSCH 410-b to the PSFCH opportunity 415-c and the PSFCH opportunity 415-g, and may map or assign the LBT sub-band 405-c or the PSSCH 410-c to the PSFCH opportunity 415-e (e.g., the LBT sub-band 405-c or the PSSCH 410-c may have a single PSFCH opportunity 415). Accordingly, in examples in which the second UE 115 receives the transmission from the first UE 115 over the PSSCH 410-a in the LBT sub-band 405-a, the second UE 115 may attempt to transmit feedback associated with the transmission over one or more of the PSFCH opportunity 415-a, the PSFCH opportunity 415-d, and the PSFCH opportunity 415-f. Alternatively, in examples in which the second UE 115 receives the transmission from the first UE 115 over the PSSCH 410-b in the LBT sub-band 405-b, the second UE 115 may attempt to transmit feedback associated with the transmission over one or more of the PSFCH opportunity 415-c and the PSFCH opportunity 415-g. Alternatively, in examples in which the second UE 115 receives the transmission from the first UE 115 over the PSSCH 410-c in the LBT sub-band 405-c, the second UE 115 may attempt to transmit feedback associated with the transmission over the PSFCH opportunity 415-e.

In some examples, some of the different PSFCH opportunities 415 may include different quantities of PRBs. For example, the PSFCH opportunity 415-a may include Z PRBs, the PSFCH opportunity 415-d may include Z' PRBs, and the PSFCH opportunity 415-f may include Z" PRBs. Such variation in size of the PSFCH opportunities 415 corresponding to the LBT sub-band 405-a or the PSSCH 410-a may be referred to herein as a heterogeneous PSFCH resource pool. In such examples, however, the configuration may refrain from separately indicating Z, Z', and Z" (even when they are of different values). Further, although FIG. 4 illustrates that each of the multiple PSFCH opportunities 415 of the multiple PSFCH resource pools are located within one PSFCH symbol 420, the described techniques may be extended to any number of PSFCH symbols 420 without exceeding the scope of the present disclosure.

Figure 5:
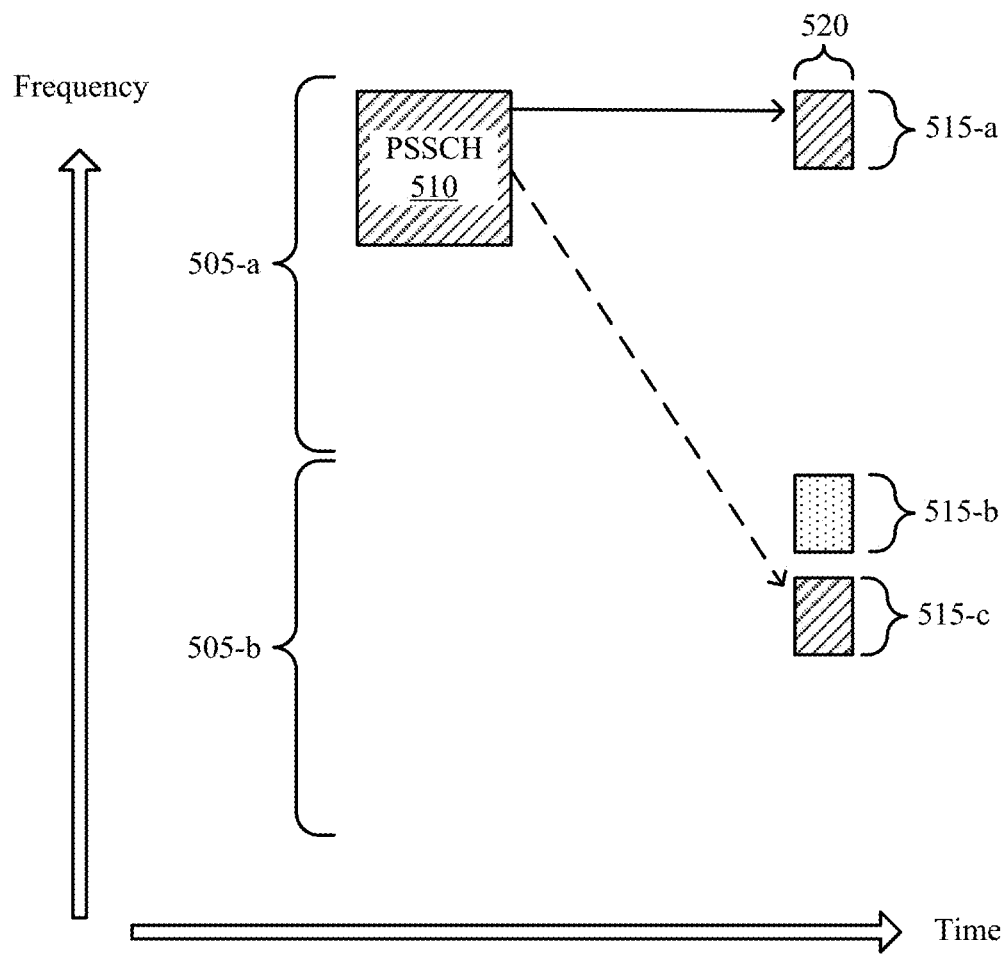

FIG. 5 illustrates an example of a resource configuration 500 that supports techniques for configuring multiple frequency domain opportunities for sidelink feedback in accordance with various aspects of the present disclosure. The resource configuration 500 may be implemented to realize aspects of the wireless communications system 100 or the wireless communications system 200. For example, a first UE 115 may groupcast a data transmission to multiple UEs 115, which may be examples of corresponding devices described herein, over a PSSCH 510 and one or more of the multiple UEs 115 may transmit feedback associated with the transmission to the first UE 115 over one or more of multiple PSFCH opportunities 515 corresponding to the PSSCH 510.

In some implementations, FIG. 5 illustrates multiple heterogeneous (in size) PSFCH resource pools in which an LBT sub-band 505-a or a PSSCH 510 may correspond to a PSFCH opportunity 515-a and a PSFCH opportunity 515-c. In some aspects, an LBT sub-band 505-b may correspond to a PSFCH opportunity 515-b. In some examples, the PSSCH 510 may be an example of a groupcast PSSCH 510 requesting groupcast HARQ feedback option 2. In some examples, and based on the heterogenous PSFCH resource pools, the PSFCH opportunity 515-a may include a first quantity of PRBs Z and the PSFCH opportunity 515-c may include a second quantity of PRBs Z'. Further, in some examples, the PSFCH opportunity 515-a may be associated with a first cyclic shift value Y and the PSFCH opportunity 515-b may be associated with a second cyclic shift value Y' different from the first cyclic shift value Y.

In such examples in which different PSFCH opportunities 515 include different numbers of PRBs and have different cyclic shift values, the configuration of the multiple PSFCH opportunities 515 may also indicate one of various options for how the multiple UEs 115 receiving the transmission over the PSSCH 510 may transmit feedback to the first UE 115. In some aspects, the options may be configured per LBT sub-band 505. In some implementations, for example, a UE 115 of the multiple UEs 115 that receive the data transmission from the first UE 115 over the PSSCH 510 may determine that the UE 115 is able to use the PSFCH opportunity 515-c (e.g., or any PSFCH opportunity 515 in the LBT sub-band 505-b) if a member ID of the UE 115 is not larger than (e.g., is less than or equal to) a product of the second quantity of PRBs in the PSFCH opportunity 515-c and the second cyclic shift value of the PSFCH opportunity 515-c. In other words, the UE 115 may use the PSFCH opportunity 515-c in the LBT sub-band 505-b if the member ID of the UE 115 is not larger than (or is less than or equal to) $Z'*Y'$. In such implementations, different UEs 115 of the multiple UEs 115 may have different quantities of PSFCH opportunities 515 (e.g., a UE 115 with a relatively lower member ID may have a greater quantity of PSFCH opportunities 515 than a UE 115 with a relatively higher member ID).

In some other implementations, the multiple UEs 115 that receive the transmission from the first UE 115 over the PSSCH 510 may determine that the multiple UEs 115 (e.g., all of the multiple UEs 115) are able to use the PSFCH opportunity 515-c if a quantity of the multiple UEs 115 X is not larger than (or is less than or equal to) a product of the second quantity of PRBs in the PSFCH opportunity 515-c and the second cyclic shift value of the PSFCH opportunity 515-c. In other words, the multiple UEs 115 may use the PSFCH opportunity 515-c in the LBT sub-band 505-b if the quantity of the multiple UEs 115 X is less than or equal to $Z'*Y'$ (e.g., if $X \leq Z'*Y'$). Alternatively, the multiple UEs 115 may refrain from using the PSFCH opportunity 515-c in the LBT sub-band 505-b if the quantity of the multiple UEs 115 X is greater than $Z'*Y'$ (e.g., if $X > Z'*Y'$). In such implementations, bigger groups of UEs 115 (e.g., such that $X > Z'*Y'$) may be blocked from having multiple PSFCH opportunities 515.

In some other implementations, the multiple UEs 115 that receive the transmission from the first UE 115 over the PSSCH 510 may determine that the multiple UEs 115 (e.g., all of the multiple UEs 115) are able to use the PSFCH opportunity 515-c if a first product of the first quantity of PRBs in the PSFCH opportunity 515-a and the first cyclic shift value of the PSFCH opportunity 515-a is less than or equal to a second product of the second quantity of PRBs in the PSFCH opportunity 515-c and the second cyclic shift value of the PSFCH opportunity 515-c. In other words, the multiple UEs 115 may use the PSFCH opportunity 515-c in the LBT sub-band 505-b if $Z'*Y' \geq Z*Y$. Alternatively, the multiple UEs 115 may refrain from using the PSFCH opportunity 515-c in the LBT sub-band 505-b if $Z'*Y' < Z*Y$ (e.g., which may be the case in examples in which the PSFCH opportunity 515-c does not exist or is relatively small). In such implementations, groupcast HARQ response option 2 may be blocked for such PSFCH opportunities that do not exist or are relatively small.

Further, although FIG. 5 illustrates that each of the multiple PSFCH opportunities 515 of the multiple PSFCH resource pools are located with one PSFCH symbol 520, the described techniques may be extended to any number of PSFCH symbols 520 without exceeding the scope of the present disclosure.

Figure 6:
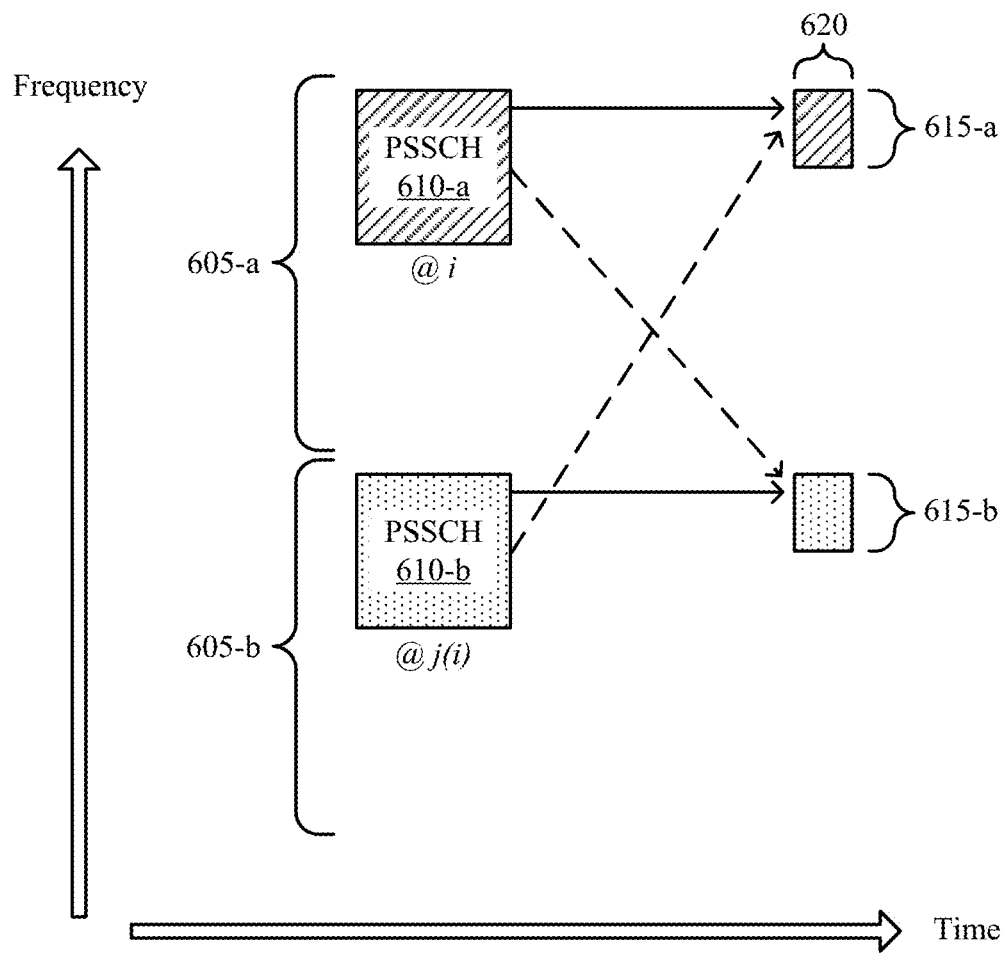

FIG. 6 illustrates an example of a resource configuration 600 that supports techniques for configuring multiple frequency domain opportunities for sidelink feedback in accordance with various aspects of the present disclosure. The resource configuration 600 may be implemented to realize aspects of the wireless communications system 100 or the wireless communications system 200. For example, a first UE 115 may transmit a transmission to a second UE 115, which may be examples of corresponding devices described herein, over a PSSCH 610 in an LBT sub-band 605 and the second UE 115 may transmit feedback associated with the transmission to the first UE 115 over one or more of multiple PSFCH opportunities 615 corresponding the PSSCH 610 or the LBT sub-band 605. In some implementations, a single PSFCH resource pool may be configured for all of the LBT sub-bands 605. In such implementations, the configuration of the multiple PSFCH opportunities 615 may define the multiple PSFCH opportunities 615 within the single PSFCH resource pool such that a PSSCH 610 or an LBT sub-band 605 may correspond to multiple PSFCH opportunities 615 over multiple LBT sub-bands 605.

In some examples, the second UE 115 may receive a configuration indicating a sub-channel index i associated with the LBT sub-band 605-a including a PSSCH 610-a over which the second UE 115 may receive the transmission from the first UE 115 and a PSFCH opportunity 615-a. In some aspects, the PSSCH 610-a may be an example of a unicast PSSCH 610 that is transmitted over the leading sub-channel index i. In some implementations of the present disclosure, the configuration may also indicate a secondary sub-channel index j(i) that falls into a different LBT sub-band 605, such as an LBT sub-band 605-b including a PSSCH 610-b and a PSFCH opportunity 615-b. The configuration may introduce a mapping from i to other sub-channels based on j (e.g., a mapping j(i) such that the second UE 115 may identify other PSFCH opportunities 615 in other LBT sub-bands 605 using j(i)). In some aspects, j(i) may be injective (e.g., a one-to-one mapping). As such, based on receiving an indication of the sub-channel index i and j(i), the second UE 115 may determine that its multiple PSFCH opportunities 615 may be found in the sub-channel index i (e.g., at the PSFCH opportunity 615-a) and at the sub-channel index j(i) (e.g., at the PSFCH opportunity 615-b).

In some cases, however, such as in cases in which the PSSCH 610-b carries a groupcast transmission, collision may occur in examples in which the second UE 115 transmits feedback over the PSFCH opportunity 615-a and the PSFCH opportunity 615-b because the PSFCH opportunity 615-b may also carry some groupcast feedback. Accordingly, in some implementations of the present disclosure, the second UE 115 may determine whether it is able to use the PSFCH opportunity 615-b (without causing collision) if the PSSCH 610-a carries a unicast transmission and if the PSSCH 610-b does not carry a groupcast transmission. For example, if the second UE 115 receives a unicast transmission over the PSSCH 610-a from the first UE 115 and detects or otherwise determines that the PSSCH 610-b does not carry a groupcast transmission (and is not a leading sub-channel), the second UE 115 may determine to use the PSFCH opportunity 615-b in addition to the PSFCH opportunity 615-a based on applying a formula. In some aspects, the second UE 115 may choose a PSFCH index (e.g., a PSFCH sequence index) at the sub-channel index j(i) in the form of the form of the formula.

In some aspects, the formula may be $(K+M+O') \bmod (Z*Y)$, where O' is an offset depending on which LBT sub-band 605 the sub-channel index i is located in (e.g., depending on the LBT sub-band 605-a), where K is an ID of the transmitting UE 115 (e.g., the first UE 115) and may be 8-bit, and where M is set to 0 for unicast transmissions and to a group ID for groupcast HARQ response option 2. In some cases, the group ID may be within a set of numbers including $\{0, 1, \ldots, X-1\}$ (where X is equal to a quantity of the UEs 115 within the group). Additionally, groupcast HARQ response option 2 (e.g., which refers to respective response for different receivers) may not be used for X>Z*Y. In some implementations of the present disclosure, j(i) and O' may be included in a higher layer signaling configuration, such as L3 signaling.

Further, although FIG. 6 illustrates that each of the multiple PSFCH opportunities 615 of a single PSFCH resource pool are located with one PSFCH symbol 620, the described techniques may be extended to any number of PSFCH symbols 620 without exceeding the scope of the present disclosure.

Figure 7:
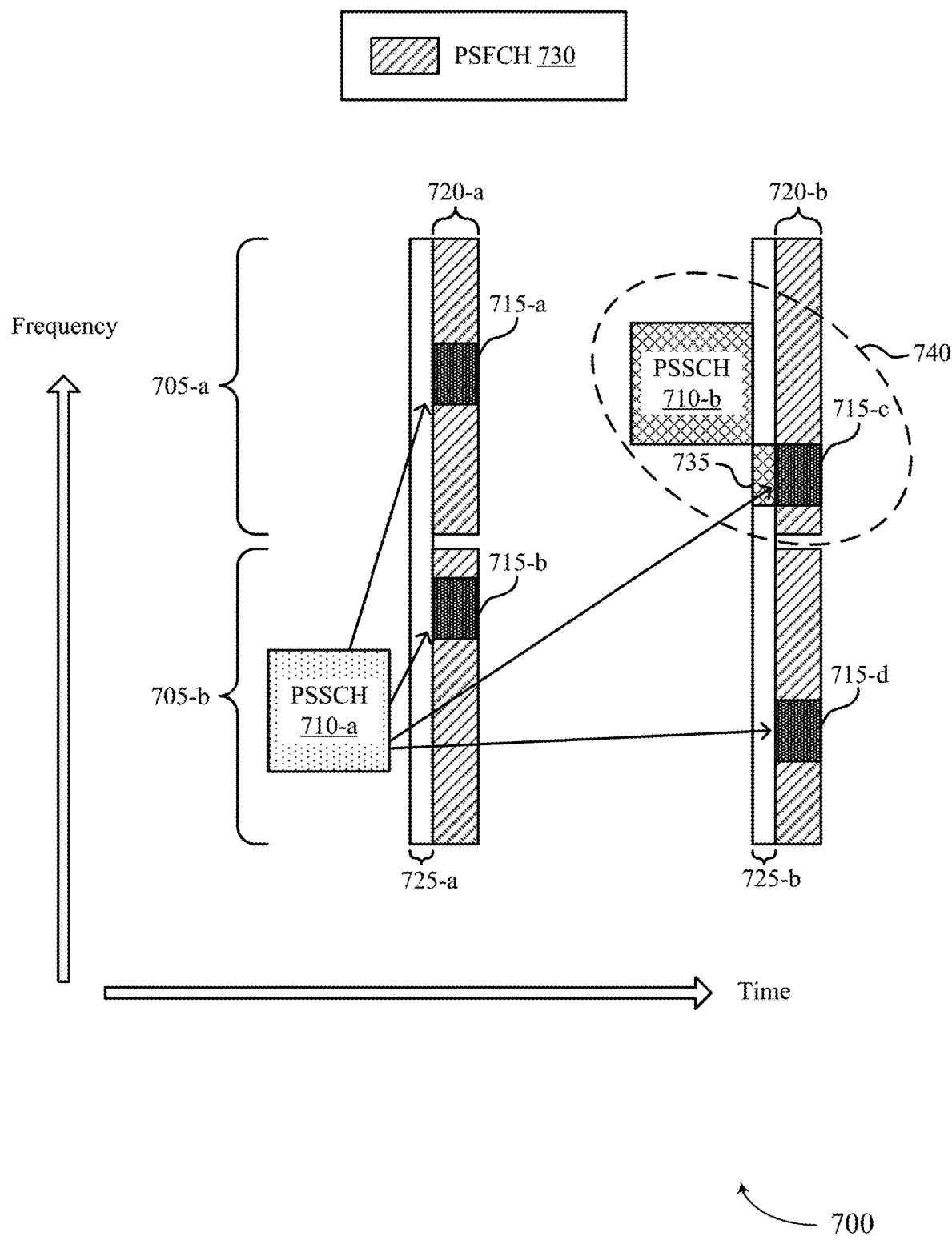

FIG. 7 illustrates an example of a resource configuration 700 that supports techniques for configuring multiple frequency domain opportunities for sidelink feedback in accordance with various aspects of the present disclosure. The resource configuration 700 may be implemented to realize aspects of the wireless communications system 100 or the wireless communications system 200. For example, a first UE 115 may transmit a transmission to a second UE 115, which may be examples of corresponding devices described herein, over a PSSCH 710 in an LBT sub-band 705 and the second UE 115 may transmit feedback associated with the transmission to the first UE 115 over one or more of multiple PSFCH opportunities 715 corresponding to the PSSCH 710 or the LBT sub-band 705. In some implementations, based on enabling multiple PSFCH opportunities 715, a sidelink UE 115 may fill a time gap 725 between a PSSCH 710-b and a PSFCH 730 with a CP extension to transmit the feedback associated with a data transmission received over a PSSCH 710-b in a same COT 740 of the PSSCH 710-b.

As described in more detail herein, including with reference to FIG. 3, the second UE 115 may receive, from the first UE 115 or from a serving base station 105, a control message configuring multiple PSFCH opportunities 715 over multiple LBT sub-bands 705 for a PSSCH 710 over which the first UE 115 may transmit data to the second UE 115. As shown in FIG. 7, the second UE 115 may receive a configuration of four PSFCH opportunities 715 over two LBT sub-bands 705 and in two PSFCH symbols 720. For instance, the control message may configure, for a PSSCH 710-a, a PSFCH opportunity 715-a in an LBT sub-band 705-a and in a PSFCH symbol 720-a, a PSFCH opportunity 715-b in an LBT sub-band 705-b and in the PSFCH symbol 720-a, a PSFCH opportunity 715-c in the LBT sub-band 705-a and in a PSFCH symbol 720-b, and a PSFCH opportunity 715-d in the LBT sub-band 705-b and in the PSFCH symbol 720-b.

In some aspects, there may be a time gap 725 between a PSSCH 710 and a PSFCH 730. In some cases, such a time gap 725 may be configured such that UEs 115 may perform LBT during the time gap 725 to determine whether a corresponding (e.g., a subsequent) PSFCH opportunity 715 is available or occupied. For example, there may be a time gap 725-a prior to the PSFCH 730 in the PSFCH symbol 720-a and a time gap 725-b prior to the PSFCH 730 in the PSFCH symbol 720-b. In some cases, a PSSCH 710-b may be scheduled adjacent to the time gap 725-b such that the time gap 725-b may represent a gap in time between the PSSCH 710-b and the PSFCH 730 in the PSFCH symbol 720-b.

In some examples, such as in examples in which the a UE 115 receives a data transmission (e.g., a unicast data transmission) over the PSSCH 710-b, the UE 115 may attempt to employ a CP extension into the time gap 725-b to enable the UE 115 to transmit feedback associated with the data transmission received over the PSSCH 710-b within a same COT 740 as the PSSCH 710-b. In some cases, however, such a CP extension into the time gap 725-b may block one or more nearby UE's 115 LBT for the PSFCH 730 (e.g., for the PSFCH opportunity 715-c). To maintain minimal blocking, the UE 115 may determine whether the UE 115 is able to employ such CP extension (e.g., whether such CP extension is allowed) based on whether conditions (e.g., pre-defined conditions) for CP extension are satisfied. In some implementations, for example, the UE 115 may employ the CP extension to transmit feedback associated with the data transmission received over the PSSCH 710-b if the PSSCH 710-b carries data having a priority that satisfies a threshold priority. In such implementations, the CP extension or the threshold priority, or both, may be configured via a system information block (SIB) or a pre-configuration. Additionally or alternatively, the UE 115 may employ the CP extension if the PSSCH 710-b has a sufficiently high likelihood of missing a packet delay budget threshold or value associated with the PSSCH 710-b. In such implementations, the CP extension can be configured via a 1-bit indication in SCI.

Additionally or alternatively, the UE 115 may employ the CP extension over one (e.g., only one) of a last time-domain PSFCH opportunity 715. For instance, in examples in which the PSFCH symbol 720-b includes the last time-domain PSFCH opportunities 715 corresponding to the PSSCH 710-b, the UE 115 may employ the CP extension. Additionally or alternatively, the UE 115 may employ the CP extension if the UE 115 has employed the CP extension below a threshold usage ratio (e.g., a pre-defined threshold usage ratio). For example, if the UE 115 has employed similar CP extension lower than a threshold number of times or at lower than a threshold frequency, the UE 115 may employ the CP extension. Additionally or alternatively, the UE 115 may employ the CP extension over a pre-configured LBT sub-band 705 or over a pre-configured LBT sub-band 705 at indicated slots. For example, the UE 115 may receive an indication of an LBT sub-band 705 (such as an LBT sub-band 705-a) or an indication of the LBT sub-band 705 at given slots and the UE 115 may employ the CP extension in the indicated LBT sub-band 705 or in the indicated LBT sub-band 705 at the given slots.

In examples in which any one or more of the above conditions for employing the CP extension are satisfied, the UE 115 (e.g. a HARQ responder) may check out the COT 740 for the PSSCH 710-b and may use the COT 740 to transmit feedback associated with the data received over the PSSCH 710-b over the PSFCH 730 without leaving the time gap 725-b before the PSFCH opportunity 715-c empty. For example, the UE 115 may transmit feedback associated with the data received over the PSSCH 710-b over a resource opportunity 735 located in the time gap 725-b between the PSSCH 710-b and the PSFCH opportunity 715-c. The UE 115, based on implementing such a CP extension, may refrain from giving up a current COT 740 based on experiencing greater than a threshold duration of silence (e.g., a lack of communication) and, accordingly, may refrain from performing category 4 (Cat4) LBT for that period (which may have a low likelihood of being successful for the PSFCH opportunity 715-c due to the short time duration between the PSSCH 710-b and the PSFCH opportunity 715-c).

Figure 8:
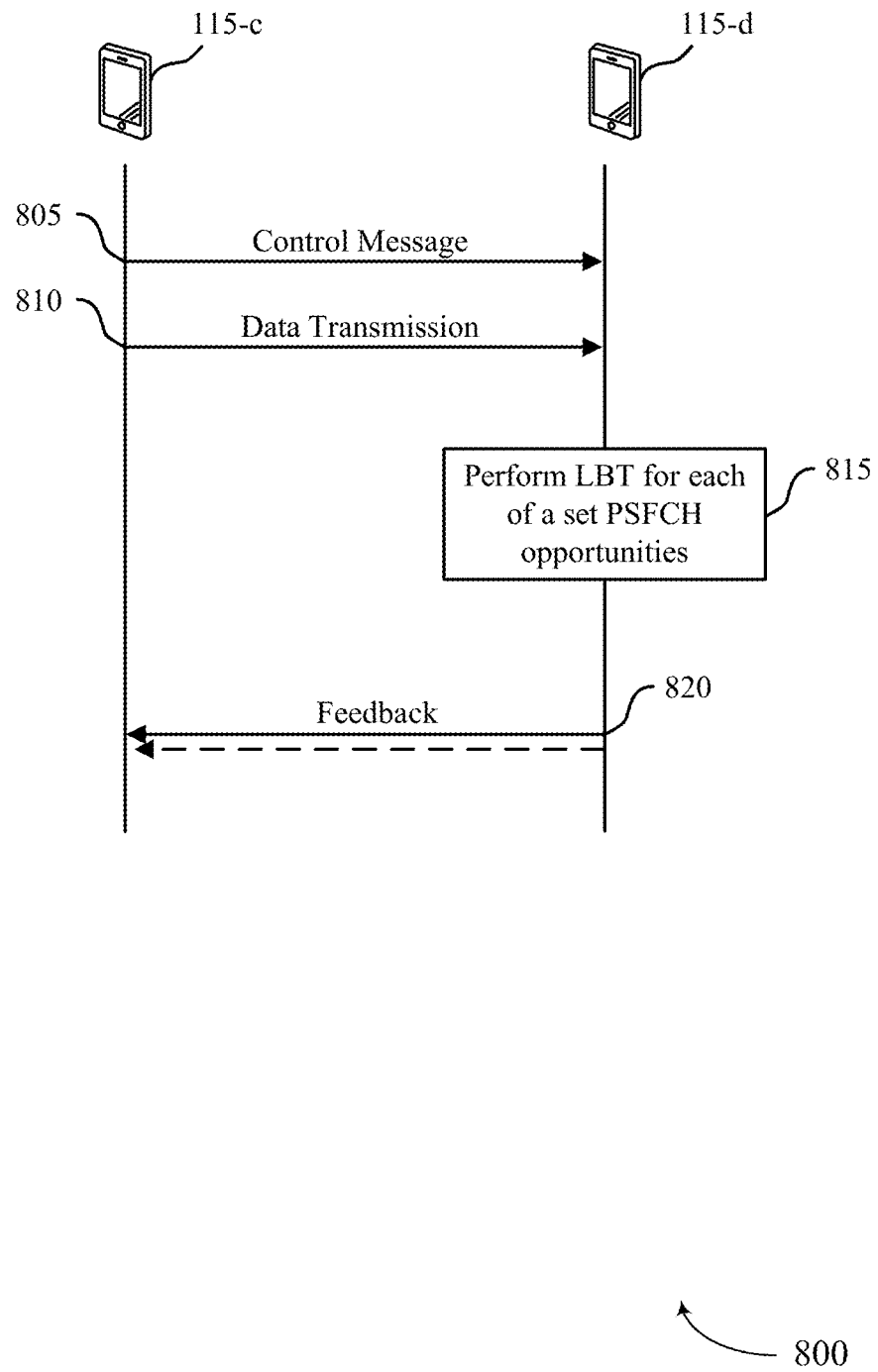
FIG. 8 illustrates an example of a process flow that supports techniques for configuring multiple frequency domain opportunities for sidelink feedback in accordance with various aspects of the present disclosure.

FIG. 8 illustrates an example of a process flow 800 that supports techniques for configuring multiple frequency domain opportunities for sidelink feedback in accordance with various aspects of the present disclosure. In some examples, the process flow 800 may implement aspects of the wireless communications system 100 or the wireless communications system 200. For example, the process flow 800 may illustrate communication between a UE 115-*d* and a UE 115-*d*, which may be examples of corresponding devices described herein. In some implementations, the UE 115-*c* may transmit a control message to the UE 115-*d* including a configuration for transmitting feedback over multiple feedback channel occasions over multiple LBT sub-bands that correspond to a sidelink data channel (e.g., a PSSCH) over which the UE 115-*c* transmits a data transmission to the UE 115-*d*.

At 805, the UE 115-*c* may transmit, to the UE 115-*d*, a control message including a configuration for multiple feedback channel occasions in multiple sub-bands (e.g., LBT sub-bands) of an unlicensed radio frequency spectrum band. In some examples, such as in examples in which the configuration indicates multiple feedback channel pools (e.g., PSFCH resource pools), the configuration for the multiple feedback channel occasions may include one or more bit vectors (e.g., one or more PRB-level bit vectors), and each bit vector may indicate the feedback channel occasions included within a feedback channel pool. In some other examples, the configuration may indicate a single feedback channel pool and the configuration may indicate a mapping (e.g., a mapping between a sub-channel index i and a sub-channel index j(i)) such that the multiple feedback channel occasions are distributed across multiple LBT sub-bands. For instance, in examples in which the configuration indicates one feedback channel pool, the configuration may indicate an index associated with a second LBT sub-band and an offset value between a first LBT sub-band and a second LBT sub-band.

In some examples, the multiple feedback channel occasions may include a first feedback channel occasion located in the first LBT sub-band and a second feedback channel occasion located in the second LBT sub-band. In some implementations, the configuration for the multiple feedback channel occasions may indicate a primary feedback channel occasion and one or more secondary feedback channel occasions. In some other implementations, the configuration for the multiple feedback channel occasions may indicate a priority or an order of the multiple feedback channel occasions.

In some examples, the multiple feedback channel occasions may be associated with groupcast feedback (e.g., groupcast HARQ feedback option 2). In an example, if the UE 115-*d* determines that a group member ID of the UE 115-*d* is less than a product of a quantity of PRBs of a feedback channel occasion and a cyclic shift value associated with the feedback channel occasion, the UE 115-*d* may include the feedback channel occasion in the multiple feedback channel occasions. In an example, if the UE 115-*d* determines that a quantity of UEs providing the groupcast feedback is less than a product of a quantity of PRBs of a feedback channel occasion and a cyclic shift value associated with the feedback channel occasion, the UE 115-*d* may include the feedback channel occasion in the multiple feedback channel occasions. In an example, if the UE 115-*d* identifies a first feedback channel occasion in a first sub-band and a second feedback channel occasion in a second sub-band and if the UE 115-*d* determines that a first product of a first quantity of PRBs of the first feedback channel occasion and a first cyclic shift value associated with the first feedback channel occasion is less than a second product of a second quantity of PRBs of the second feedback channel occasion and a second cyclic shift value associated with the second feedback channel occasion, the UE 115-*d* may include both the first feedback channel occasion and the second feedback channel occasion in the multiple feedback channel occasions.

At 810, the UE 115-*c* may transmit, to the UE 115-*d*, a data transmission over a first sidelink data channel in the first LBT sub-band of the unlicensed radio frequency spectrum band. In some examples, the data transmission may be a unicast transmission. In such examples, if the UE 115-*d* detects a unicast transmission over a second sidelink data channel in the second LBT sub-band, the UE 115-*d* may include, in the multiple feedback channel occasions, a first feedback channel occasion located in the first LBT sub-band and a second feedback channel occasion located in the second LBT sub-band based at least in part on detecting the unicast transmission. The UE 115-*d* may transmit a sequence over the first feedback channel occasion or the second feedback channel occasion based at least in part on a formula. The formula may include a first product of a summation of an ID associated with the UE 115-*c* and an offset value between the second LBT sub-band and the first LBT sub-band and a modulo operation of a second product of a quantity of PRBs of the first feedback channel occasion and a cyclic shift value associated with the first feedback channel occasion.

At 815, the UE 115-*d* may perform an LBT procedure for each of the multiple feedback channel occasions. The LBT procedure may be equivalently referred to as a channel access procedure. The UE 115-*d* may perform the LBT procedure to determine which of the multiple feedback channel occasions are available for transmitting feedback associated with the data transmission to the UE 115-*c*.

At 820, the UE 115-*d* may transmit, to the UE 115-*c*, feedback associated with the data transmission over one or more of the multiple feedback channel occasions based at least in part on the LBT procedure and the configuration for the multiple feedback channel occasions. In some examples, the UE 115-*d* may transmit the feedback to the UE 115-*c* over each feedback channel occasion of the multiple feedback channel occasions that is associated with a successful LBT procedure and is located in an earliest symbol period. In some other examples, the UE 115-*d* may transmit the feedback to the UE 115-*c* over a primary feedback channel occasion or over any secondary feedback channel occasions of the multiple feedback channel occasions based at least in part on whether the primary feedback channel occasion is associated with a successful LBT procedure. For example, if the LBT procedure for the primary feedback channel occasion is successful, the UE 115-*d* may transmit the feedback to the UE 115-*c* over the primary feedback channel occasion. Alternatively, if the LBT procedure for the primary feedback channel occasion is unsuccessful, the UE 115-*d* may transmit the feedback to the UE 115-*c* over any one of the second feedback channel occasions.

In some other examples, the UE 115-*d* may transmit the feedback to the UE 115-*c* over a feedback channel occasion of the multiple feedback channel occasions that has a highest priority and is associated with a successful LBT procedure. In some other examples, the UE 115-*d* may transmit the feedback to the UE 115-*c* over each feedback channel occasion of the multiple feedback channel occasions that is associated with a successful LBT procedure. In some other examples, the UE 115-*d* may transmit the feedback to the UE 115-*c* within a same COT of the data transmission based at least in part on a cyclic prefix extension. In some implementations, the UE 115-*d* may transmit the feedback to the UE 115-*c* over a resource occasion prior to the feedback channel within the same COT of the data transmission based at least in part on determining that a priority of the data transmission satisfies a threshold priority, that the first feedback channel occasion is an only feedback channel occasion that satisfies a packet delay budget of the transmission, that the first feedback channel occasion is in a last symbol period including a feedback channel occasion, that previous cyclic prefix extensions have occurred below a threshold amount, that the first feedback channel occasion is configured for transmitting the feedback within the same channel occupancy time, or any combination thereof.

Figure 9:
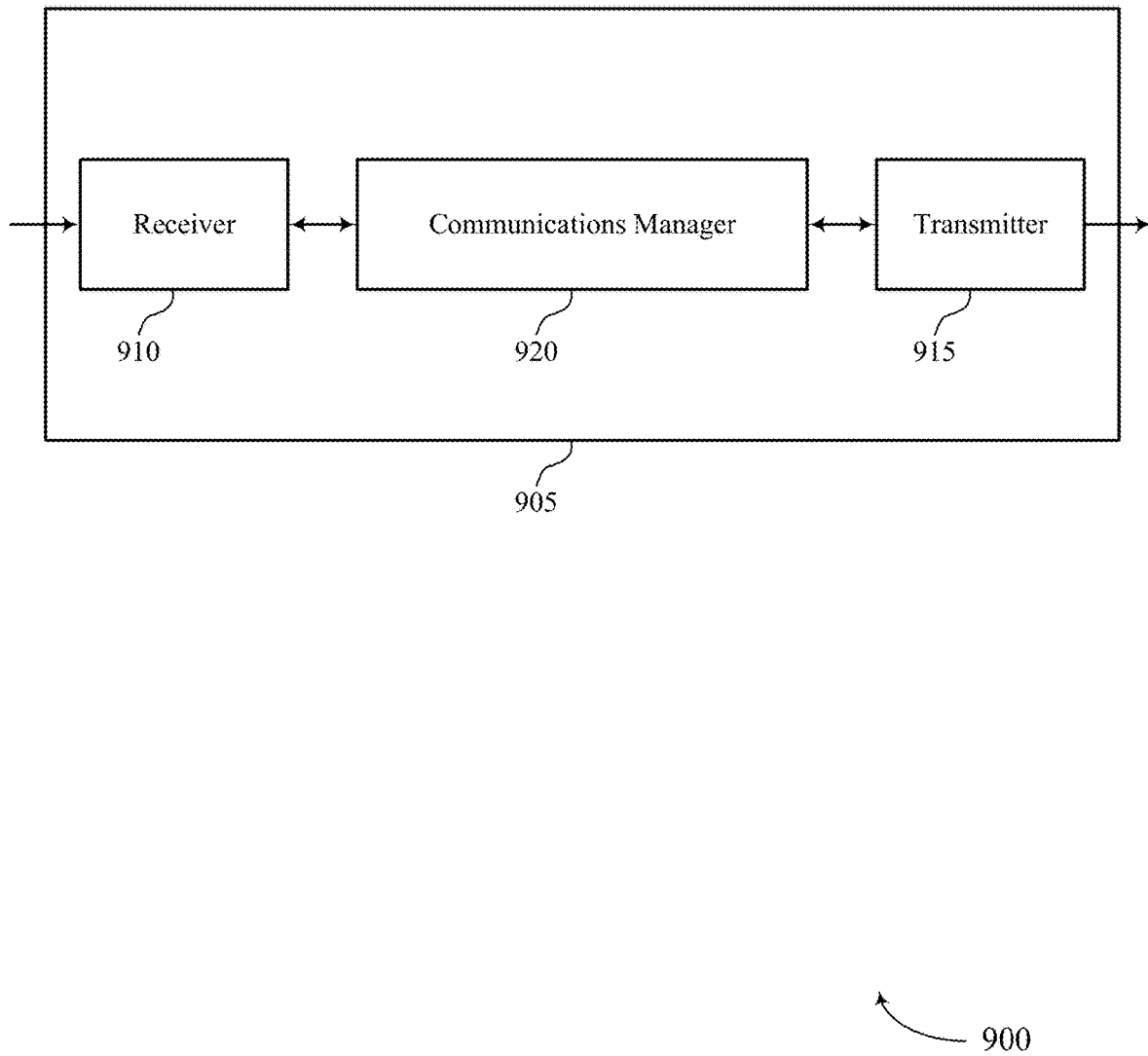
FIGS. 9 and 10 show block diagrams of devices that support techniques for configuring multiple frequency domain opportunities for sidelink feedback in accordance with various aspects of the present disclosure.

FIG. 9 shows a block diagram 900 of a device 905 that supports techniques for configuring multiple frequency domain opportunities for sidelink feedback in accordance with various aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for configuring multiple frequency domain opportunities for sidelink feedback). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for configuring multiple frequency domain opportunities for sidelink feedback). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for configuring multiple frequency domain opportunities for sidelink feedback as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving a transmission over a first sidelink data channel in a first sub-band of an unlicensed radio frequency spectrum band. The communications manager 920 may be configured as or otherwise support a means for performing an LBT for each of a set of multiple feedback channel occasions corresponding to the first sidelink data channel in the first sub-band, the set of multiple feedback channel occasions in a set of multiple sub-bands. The communications manager 920 may be configured as or otherwise support a means for transmitting feedback associated with the transmission over one or more feedback channel occasions of the set of multiple feedback channel occasions based on the LBT for each of the set of multiple feedback channel occasions.

Additionally or alternatively, the communications manager 920 may support wireless communication at a UE in accordance with examples as disclosed herein. For example, the communications manager 920 may be configured as or otherwise support a means for transmitting a control message including a configuration of a set of multiple feedback channel occasions in a set of multiple sub-bands of an unlicensed radio frequency spectrum band corresponding to a first sidelink data channel in a first sub-band of the unlicensed radio frequency spectrum band. The communications manager 920 may be configured as or otherwise support a means for transmitting a transmission over the first sidelink data channel in the first sub-band of the unlicensed radio frequency spectrum band. The communications manager 920 may be configured as or otherwise support a means for receiving feedback associated with the transmission over one or more feedback channel occasions of the set of multiple feedback channel occasions based on an LBT for each of the set of multiple feedback channel occasions.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources.

In some examples, the communications manager 920 may be implemented as an integrated circuit or chipset for a mobile device modem, and the receiver 910 and the transmitter 915 may be implemented as analog components (for example, amplifiers, filters, antennas) coupled to the mobile device modem to enable wireless transmission and reception over one or more bands.

The communications manager 920 may be implemented to realize one or more potential advantages. In some implementations in which the communications manager 920 functions as a device transmitting feedback, the communications manager 920 may experience a greater likelihood of performing a successful LBT procedure for at least one of multiple PSFCH opportunities over multiple LBT sub-bands over which the communications manager 920 may transmit feedback responsive to a data transmission over a PSSCH in an LBT sub-band (where the multiple PSFCH opportunities correspond to (e.g., are assigned or mapped to) the PSSCH or the LBT sub-band over which the data transmission is sent). Based on having a greater likelihood for at least one of the multiple PSFCH opportunities to pass LBT, the communications manager 920 may likewise have a greater likelihood of transmitting feedback to a transmitting device (e.g., another UE 115), which may result in fewer potentially unnecessary re-transmissions of the data transmission. In other words, based on implementing aspects of the present disclosure, the communications manager 920 may receive fewer re-transmissions of a data transmission due to LBT failure (which may be unnecessary re-transmissions) rather than due to reception failure. Accordingly, based on potentially reducing a number of re-transmissions that are sent, the communications manager 920 may lower the likelihood of a declaration of an RLF event.

Based on reducing a number of potentially unnecessary re-transmissions and lowering the likelihood of RLF, the communications manager 920, or one or more processing components of the communications manager 920, may enter a sleep mode (or power off) for longer durations or more frequently, which may improve power savings and increase battery life at the device 905.

Further, in examples in which the communications manager 920 functions as a device receiving feedback, and based on implementing the described techniques, the communications manager 920 may have a greater likelihood of receiving feedback from a receiving device (e.g., another UE 115), which may provide greater or more robust insight into how a data transmission was received at the receiving device for the communications manager 920. For example, based on having a greater likelihood of receiving feedback from the receiving device, the communications manager 920 may more accurately determine whether the data transmission was successfully or unsuccessfully received. Accordingly, the communications manager 920 may more accurately determine whether a re-transmission of the data transmission is necessary (as the likelihood of the communications manager 920 failing to receive feedback due to LBT failure, as opposed to reception failure, is lower). In examples in which the communications manager 920 experiences such a lower likelihood of failing to receive feedback due to LBT failure, the communications manager 920 may more accurately determine whether to send a re-transmission of the data transmission, which may also improve power savings and increase battery life of the device 905.

Figure 10:
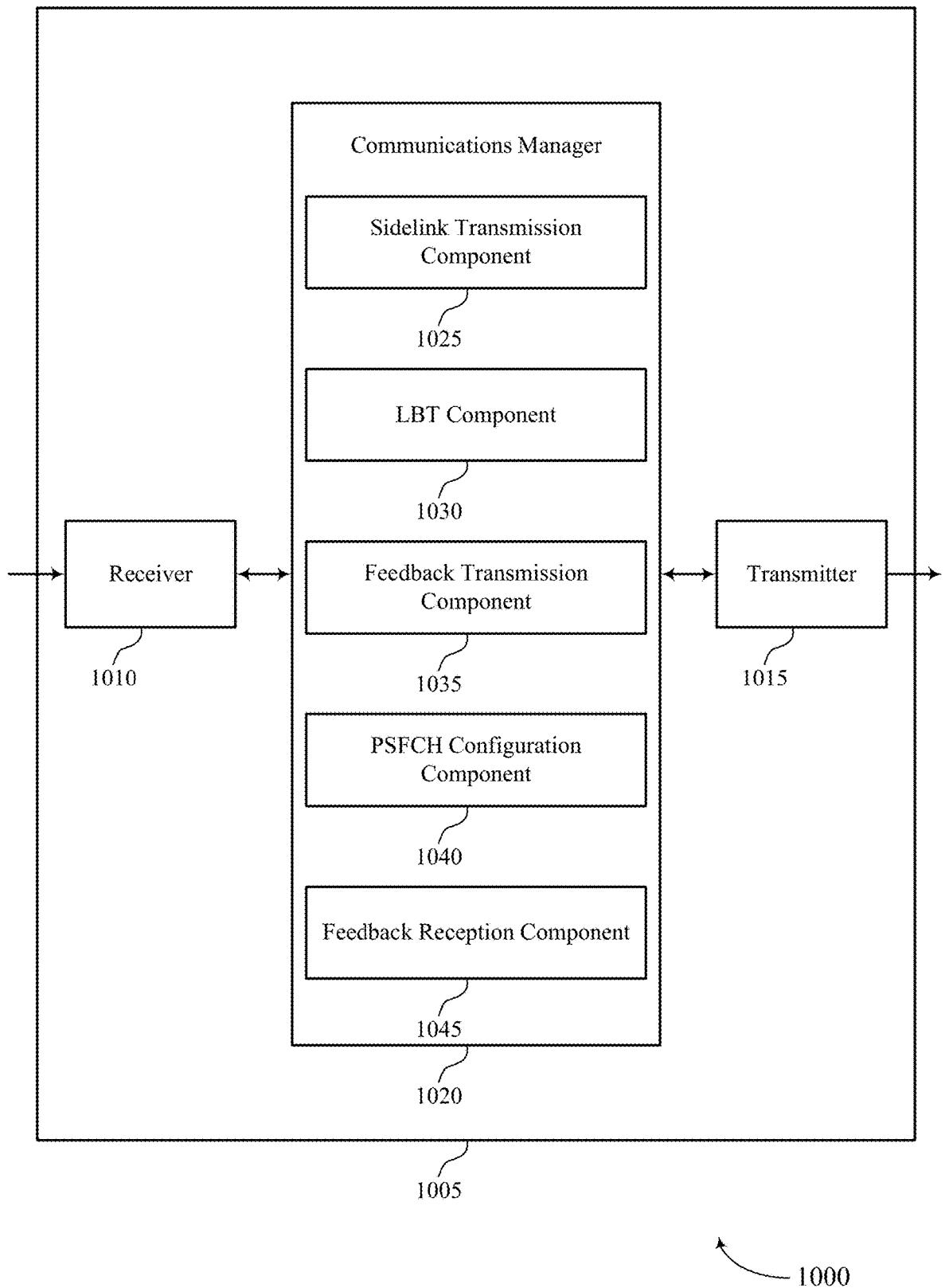

FIG. 10 shows a block diagram 1000 of a device 1005 that supports techniques for configuring multiple frequency domain opportunities for sidelink feedback in accordance with various aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for configuring multiple frequency domain opportunities for sidelink feedback). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for configuring multiple frequency domain opportunities for sidelink feedback). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for configuring multiple frequency domain opportunities for sidelink feedback as described herein. For example, the communications manager 1020 may include a sidelink transmission component 1025, an LBT component 1030, a feedback transmission component 1035, an PSFCH configuration component 1040, a feedback reception component 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The sidelink transmission component 1025 may be configured as or otherwise support a means for receiving a transmission over a first sidelink data channel in a first sub-band of an unlicensed radio frequency spectrum band. The LBT component 1030 may be configured as or otherwise support a means for performing an LBT for each of a set of multiple feedback channel occasions corresponding to the first sidelink data channel in the first sub-band, the set of multiple feedback channel occasions in a set of multiple sub-bands. The feedback transmission component 1035 may be configured as or otherwise support a means for transmitting feedback associated with the transmission over one or more feedback channel occasions of the set of multiple feedback channel occasions based on the LBT for each of the set of multiple feedback channel occasions.

Additionally or alternatively, the communications manager 1020 may support wireless communication at a UE in accordance with examples as disclosed herein. The PSFCH configuration component 1040 may be configured as or otherwise support a means for transmitting a control message including a configuration of a set of multiple feedback channel occasions in a set of multiple sub-bands of an unlicensed radio frequency spectrum band corresponding to a first sidelink data channel in a first sub-band of the unlicensed radio frequency spectrum band. The sidelink transmission component 1025 may be configured as or otherwise support a means for transmitting a transmission over the first sidelink data channel in the first sub-band of the unlicensed radio frequency spectrum band. The feedback reception component 1045 may be configured as or otherwise support a means for receiving feedback associated with the transmission over one or more feedback channel occasions of the set of multiple feedback channel occasions based on an LBT for each of the set of multiple feedback channel occasions.

Figure 11:
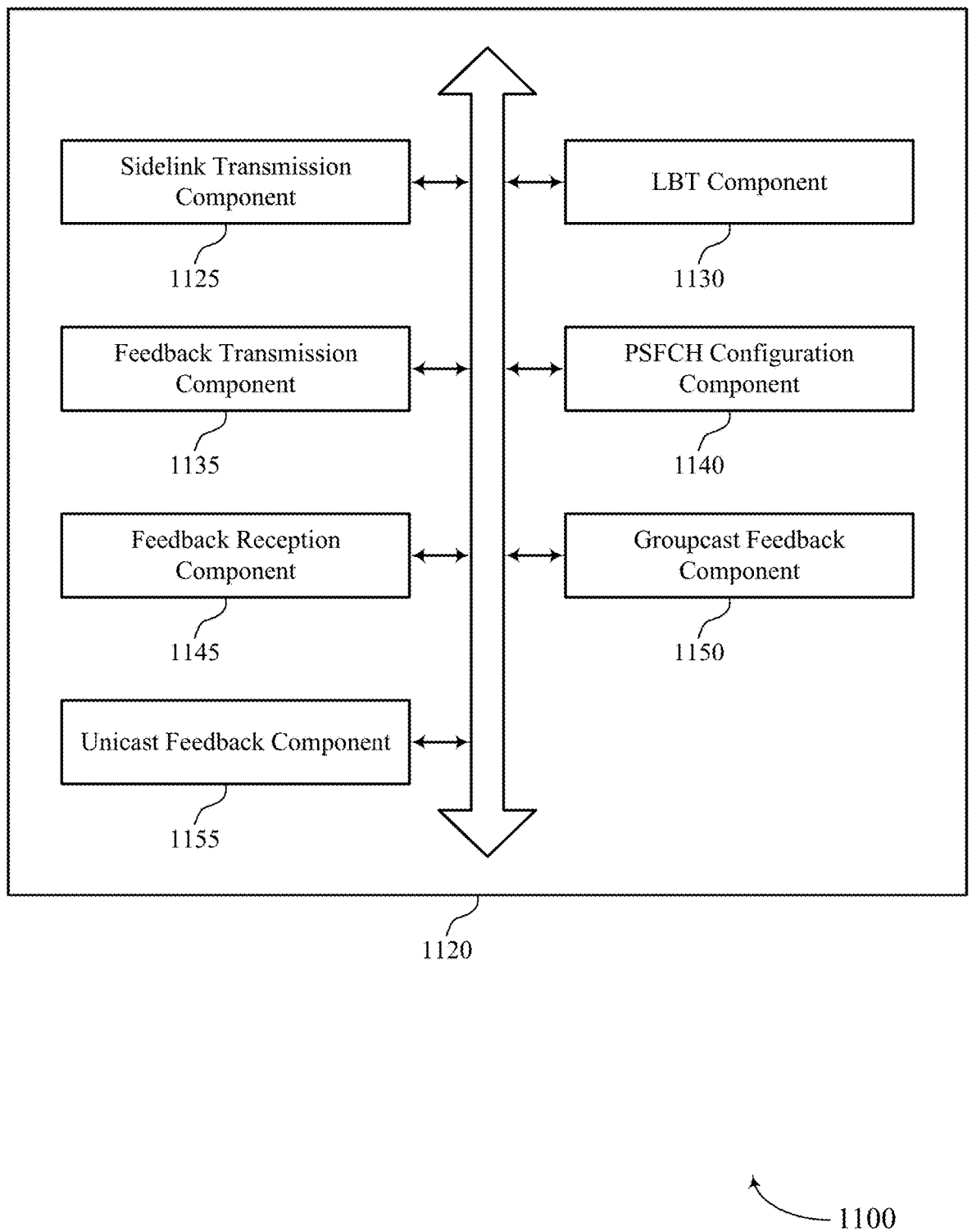
FIG. 11 shows a block diagram of a communications manager that supports techniques for configuring multiple frequency domain opportunities for sidelink feedback in accordance with various aspects of the present disclosure.

FIG. 11 shows a block diagram 1100 of a communications manager 1120 that supports techniques for configuring multiple frequency domain opportunities for sidelink feedback in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for configuring multiple frequency domain opportunities for sidelink feedback as described herein. For example, the communications manager 1120 may include a sidelink transmission component 1125, an LBT component 1130, a feedback transmission component 1135, an PSFCH configuration component 1140, a feedback reception component 1145, a groupcast feedback component 1150, a unicast feedback component 1155, or any combination thereof. Each of these components may communicate, directly or indirectly, with one another (e.g., via one or more buses).

The communications manager 1120 may support wireless communication at a UE in accordance with examples as disclosed herein. The sidelink transmission component 1125 may be configured as or otherwise support a means for receiving a transmission over a first sidelink data channel in a first sub-band of an unlicensed radio frequency spectrum band. The LBT component 1130 may be configured as or otherwise support a means for performing an LBT for each of a set of multiple feedback channel occasions corresponding to the first sidelink data channel in the first sub-band, the set of multiple feedback channel occasions in a set of multiple sub-bands. The feedback transmission component 1135 may be configured as or otherwise support a means for transmitting feedback associated with the transmission over one or more feedback channel occasions of the set of multiple feedback channel occasions based on the LBT for each of the set of multiple feedback channel occasions.

In some examples, the PSFCH configuration component 1140 may be configured as or otherwise support a means for receiving a control message including a configuration of the set of multiple feedback channel occasions corresponding to the first sidelink data channel in the first sub-band, where performing the LBT for each of the set of multiple feedback channel occasions is based on the configuration of the set of multiple feedback channel occasions.

In some examples, to support receiving the control message including the configuration of the set of multiple feedback channel occasions, the PSFCH configuration component 1140 may be configured as or otherwise support a means for receiving the control message including the configuration indicating a set of multiple feedback channel pools, each of the set of multiple feedback channel pools corresponding to one sub-band of the unlicensed radio frequency spectrum band, where the set of multiple feedback channel occasions includes one feedback channel pool of the set of multiple feedback channel pools. In some examples, the configuration indicating the set of multiple feedback channel pools includes a set of multiple bit vectors, each bit vector indicating a different one of the set of multiple feedback channel pools.

In some examples, the set of multiple feedback channel occasions are associated with groupcast feedback, and the groupcast feedback component 1150 may be configured as or otherwise support a means for determining that a group member ID of the UE is less than a product of a quantity of PRBs of a feedback channel occasion of the set of multiple feedback channel occasions and a cyclic shift value associated with the feedback channel occasion. In some examples, the set of multiple feedback channel occasions are associated with groupcast feedback, and the groupcast feedback component 1150 may be configured as or otherwise support a means for including the feedback channel occasion in the set of multiple feedback channel occasions based on determining that the group member ID of the UE is less than the product of the quantity of PRBs and the cyclic shift value.

In some examples, the set of multiple feedback channel occasions are associated with groupcast feedback, and the groupcast feedback component 1150 may be configured as or otherwise support a means for determining that a quantity of UEs providing the groupcast feedback is less than a product of a quantity of PRBs of a feedback channel occasion of the set of multiple feedback channel occasions and a cyclic shift value associated with the feedback channel occasion. In some examples, the set of multiple feedback channel occasions are associated with groupcast feedback, and the groupcast feedback component 1150 may be configured as or otherwise support a means for including the feedback channel occasion in the set of multiple feedback channel occasions based on determining that the quantity of UEs providing the groupcast feedback is less than the product of the quantity of PRBs and the cyclic shift value.

In some examples, the set of multiple feedback channel occasions are associated with groupcast feedback, and the groupcast feedback component 1150 may be configured as or otherwise support a means for identifying that the set of multiple feedback channel occasions includes a first feedback channel occasion in the first sub-band and a second feedback channel occasion in a second sub-band. In some examples, the set of multiple feedback channel occasions are associated with groupcast feedback, and the groupcast feedback component 1150 may be configured as or otherwise support a means for determining that a first product of a first quantity of PRBs of the first feedback channel occasion and a first cyclic shift value associated with the first feedback channel occasion is less than a second product of a second quantity of PRBs of the second feedback channel occasion and a second cyclic shift value associated with the second feedback channel occasion. In some examples, the set of multiple feedback channel occasions are associated with groupcast feedback, and the groupcast feedback component 1150 may be configured as or otherwise support a means for including the first feedback channel occasion and the second feedback channel occasion in the set of multiple feedback channel occasions based on determining that the first product is less than the second product.

In some examples, to support receiving the control message including the configuration of the set of multiple feedback channel occasions, the PSFCH configuration component 1140 may be configured as or otherwise support a means for receiving the control message including the configuration indicating an index associated with a second sub-band and an offset value between the first sub-band and the second sub-band, where the set of multiple feedback channel occasions include a first feedback channel occasion located in the first sub-band and a second feedback channel occasion located in the second sub-band.

In some examples, the transmission is a unicast transmission, and the unicast feedback component 1155 may be configured as or otherwise support a means for detecting a second unicast transmission over a second sidelink data channel in the second sub-band based on the index associated with the second sub-band. In some examples, the transmission is a unicast transmission, and the unicast feedback component 1155 may be configured as or otherwise support a means for selecting the first feedback channel occasion and the second feedback channel occasion as two of the set of multiple feedback channel occasions based on detecting the second unicast transmission in the second sub-band and a formula.

In some examples, the formula includes a first product of a summation of an ID associated with a transmitting UE from which the transmission is received and the offset value between the first sub-band and the second sub-band and a modulo operation of a second product of a quantity of PRBs of the first feedback channel occasion and a cyclic shift value associated with the first feedback channel occasion.

In some examples, to support transmitting the feedback associated with the transmission over the one or more feedback channel occasions of the set of multiple feedback channel occasions, the feedback transmission component 1135 may be configured as or otherwise support a means for transmitting the feedback over each feedback channel occasion of the set of multiple feedback channel occasions that is associated with a successful LBT and that is located in an earliest symbol period including a feedback channel occasion.

In some examples, the feedback transmission component 1135 may be configured as or otherwise support a means for receiving a configuration indicating a primary feedback channel occasion and one or more secondary feedback channel occasions of the set of multiple feedback channel occasions. In some examples, to transmit the feedback associated with the transmission over the one or more feedback channel occasions of the set of multiple feedback channel occasions, the feedback transmission component 1135 may be configured as or otherwise support a means for transmitting the feedback over the primary feedback channel occasion or over any of the one or more secondary feedback channel occasions based on whether the primary feedback channel occasion is associated with a successful LBT.

In some examples, the feedback transmission component 1135 may be configured as or otherwise support a means for receiving a configuration indicating a priority of the set of multiple feedback channel occasions. In some examples, to transmit the feedback associated with the transmission over the one or more feedback channel occasions of the set of multiple feedback channel occasions, the feedback transmission component 1135 may be configured as or otherwise support a means for transmitting the feedback over a feedback channel occasion of the set of multiple feedback channel occasions that has a highest priority and that is associated with a successful LBT.

In some examples, to support transmitting the feedback associated with the transmission over the one or more feedback channel occasions of the set of multiple feedback channel occasions, the feedback transmission component 1135 may be configured as or otherwise support a means for transmitting the feedback over each feedback channel occasion of the set of multiple feedback channel occasions that is associated with a successful LBT.

In some examples, to support transmitting the feedback associated with the transmission over the one or more feedback channel occasions of the set of multiple feedback channel occasions, the feedback transmission component 1135 may be configured as or otherwise support a means for transmitting the feedback over a first feedback channel occasion within a same COT of the transmission based on a cyclic prefix extension.

In some examples, the feedback transmission component 1135 may be configured as or otherwise support a means for determining that a priority of the transmission satisfies a threshold priority, that the first feedback channel occasion is an only feedback channel occasion that satisfies a packet delay budget of the transmission, that the first feedback channel occasion is in a last symbol period including a feedback channel occasion, that previous cyclic prefix extensions have occurred below a threshold amount, that the first feedback channel occasion is configured for transmitting the feedback within the same COT, or any combination thereof, where transmitting the feedback over the first feedback channel occasion within the same COT of the transmission is based on the determining.

Additionally or alternatively, the communications manager 1120 may support wireless communication at a UE in accordance with examples as disclosed herein. The PSFCH configuration component 1140 may be configured as or otherwise support a means for transmitting a control message including a configuration of a set of multiple feedback channel occasions in a set of multiple sub-bands of an unlicensed radio frequency spectrum band corresponding to a first sidelink data channel in a first sub-band of the unlicensed radio frequency spectrum band. In some examples, the sidelink transmission component 1125 may be configured as or otherwise support a means for transmitting a transmission over the first sidelink data channel in the first sub-band of the unlicensed radio frequency spectrum band. The feedback reception component 1145 may be configured as or otherwise support a means for receiving feedback associated with the transmission over one or more feedback channel occasions of the set of multiple feedback channel occasions based on an LBT for each of the set of multiple feedback channel occasions.

In some examples, to support transmitting the control message including the configuration of the set of multiple feedback channel occasions, the PSFCH configuration component 1140 may be configured as or otherwise support a means for transmitting the control message including the configuration indicating a set of multiple feedback channel pools, each of the set of multiple feedback channel pools corresponding to one sub-band of the unlicensed radio frequency spectrum band, where the set of multiple feedback channel occasions includes one feedback channel pool of the set of multiple feedback channel pools.

In some examples, the configuration indicating the set of multiple feedback channel pools includes a set of multiple bit vectors, each bit vector indicating a different one of the set of multiple feedback channel pools.

In some examples, to support transmitting the control message including the configuration of the set of multiple feedback channel occasions, the PSFCH configuration component 1140 may be configured as or otherwise support a means for transmitting the control message including the configuration indicating an index associated with a second sub-band and an offset value between the first sub-band and the second sub-band, where the set of multiple feedback channel occasions include a first feedback channel occasion located in the first sub-band and a second feedback channel occasion located in the second sub-band.

In some examples, to support receiving the feedback associated with the transmission over the one or more feedback channel occasions of the set of multiple feedback channel occasions, the feedback reception component 1145 may be configured as or otherwise support a means for receiving the feedback over each feedback channel occasion of the set of multiple feedback channel occasions that is associated with a successful LBT and that is located in an earliest symbol period including a feedback channel occasion.

In some examples, transmitting the control message includes transmitting the configuration indicating a primary feedback channel occasion and one or more secondary feedback channel occasions of the set of multiple feedback channel occasions. In some examples, receiving the feedback associated with the transmission over the one or more feedback channel occasions of the set of multiple feedback channel occasions includes receiving the feedback over the primary feedback channel occasion or over any of the one or more secondary feedback channel occasions based on whether the primary feedback channel occasion is associated with a successful LBT.

In some examples, transmitting the control message includes transmitting the configuration indicating a priority of the set of multiple feedback channel occasions. In some examples, receiving the feedback associated with the transmission over the one or more feedback channel occasions of the set of multiple feedback channel occasions includes receiving the feedback over a feedback channel occasion of the set of multiple feedback channel occasions that has a highest priority and that is associated with a successful LBT.

In some examples, to support receiving the feedback associated with the transmission over the one or more feedback channel occasions of the set of multiple feedback channel occasions, the feedback reception component 1145 may be configured as or otherwise support a means for receiving the feedback over each feedback channel occasion of the set of multiple feedback channel occasions that is associated with a successful LBT.

In some examples, to support receiving the feedback associated with the transmission over the one or more feedback channel occasions of the set of multiple feedback channel occasions, the feedback reception component 1145 may be configured as or otherwise support a means for receiving the feedback over a first feedback channel occasion within a same COT of the transmission based on a cyclic prefix extension.

Figure 12:
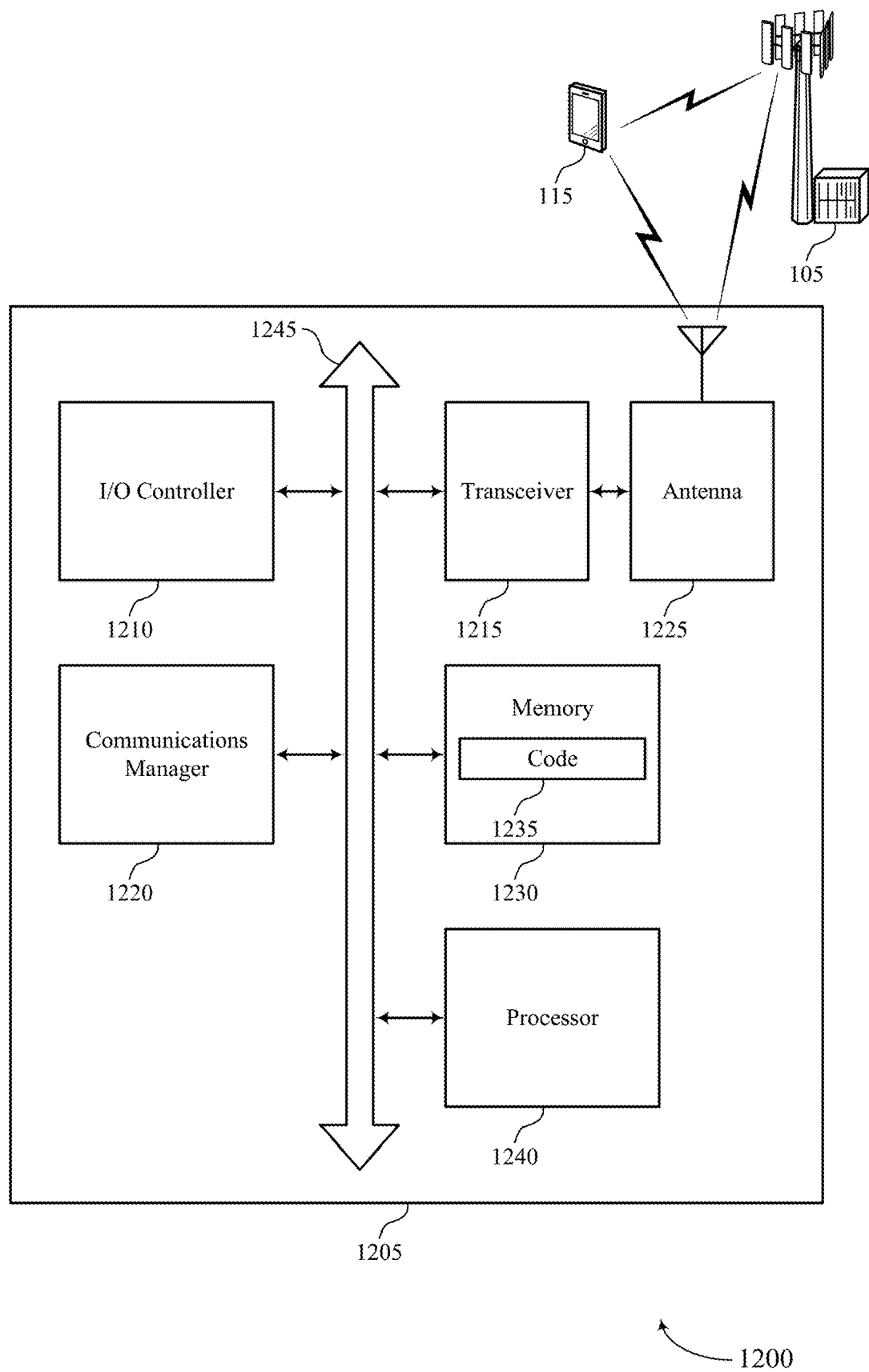
FIG. 12 shows a diagram of a system including a device that supports techniques for configuring multiple frequency domain opportunities for sidelink feedback in accordance with various aspects of the present disclosure.

FIG. 12 shows a diagram of a system 1200 including a device 1205 that supports techniques for configuring multiple frequency domain opportunities for sidelink feedback in accordance with various aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for configuring multiple frequency domain opportunities for sidelink feedback). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving a transmission over a first sidelink data channel in a first sub-band of an unlicensed radio frequency spectrum band. The communications manager 1220 may be configured as or otherwise support a means for performing an LBT for each of a set of multiple feedback channel occasions corresponding to the first sidelink data channel in the first sub-band, the set of multiple feedback channel occasions in a set of multiple sub-bands. The communications manager 1220 may be configured as or otherwise support a means for transmitting feedback associated with the transmission over one or more feedback channel occasions of the set of multiple feedback channel occasions based on the LBT for each of the set of multiple feedback channel occasions.

Additionally or alternatively, the communications manager 1220 may support wireless communication at a UE in accordance with examples as disclosed herein. For example, the communications manager 1220 may be configured as or otherwise support a means for transmitting a control message including a configuration of a set of multiple feedback channel occasions in a set of multiple sub-bands of an unlicensed radio frequency spectrum band corresponding to a first sidelink data channel in a first sub-band of the unlicensed radio frequency spectrum band. The communications manager 1220 may be configured as or otherwise support a means for transmitting a transmission over the first sidelink data channel in the first sub-band of the unlicensed radio frequency spectrum band. The communications manager 1220 may be configured as or otherwise support a means for receiving feedback associated with the transmission over one or more feedback channel occasions of the set of multiple feedback channel occasions based on an LBT for each of the set of multiple feedback channel occasions.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for configuring multiple frequency domain opportunities for sidelink feedback as described herein, or the processor 1240 and the memory 1230 may be otherwise configured to perform or support such operations.

Figure 13:
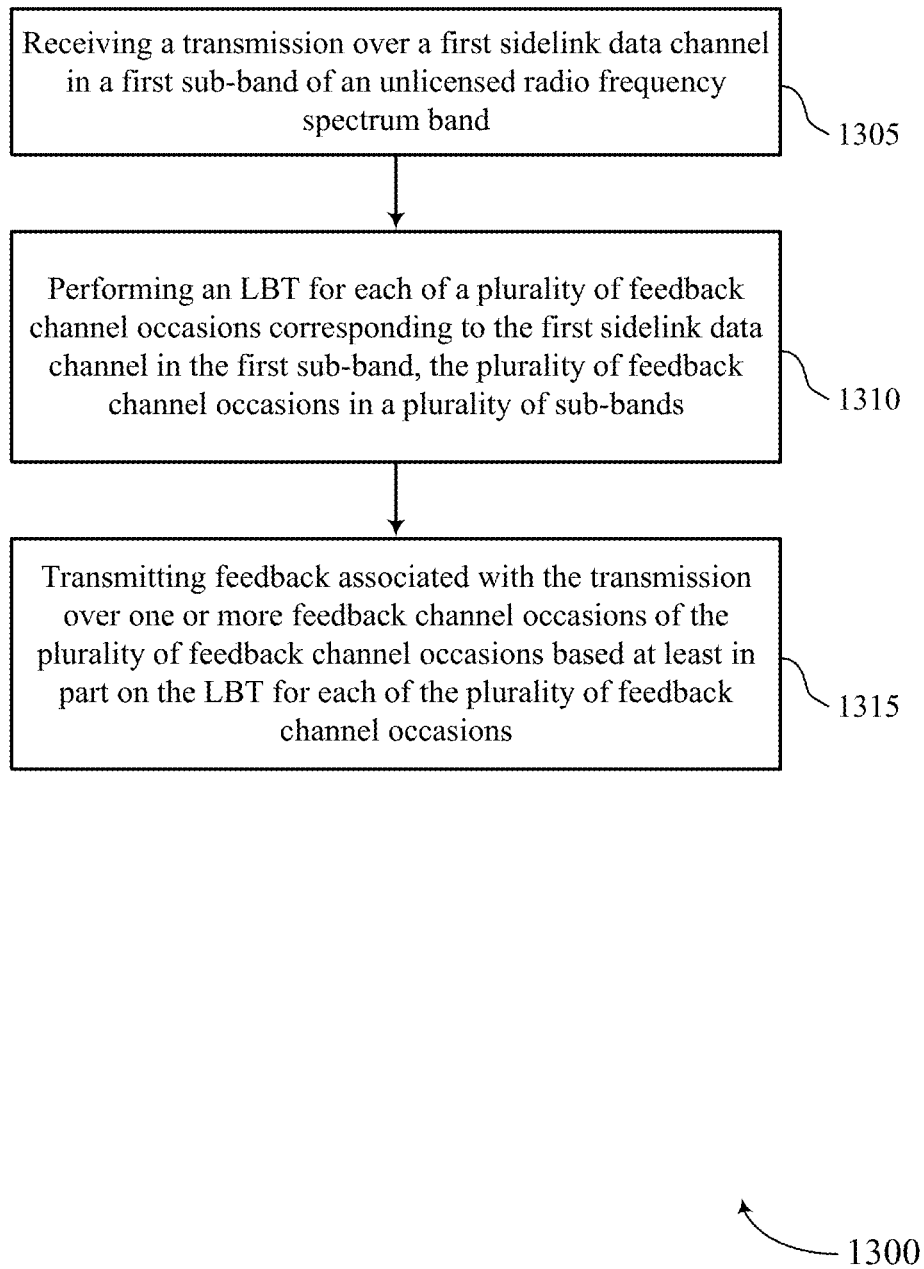
FIGS. 13 through 15 show flowcharts illustrating methods that support techniques for configuring multiple frequency domain opportunities for sidelink feedback in accordance with various aspects of the present disclosure.

FIG. 13 shows a flowchart illustrating a method 1300 that supports techniques for configuring multiple frequency domain opportunities for sidelink feedback in accordance with various aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include receiving a transmission over a first sidelink data channel in a first sub-band of an unlicensed radio frequency spectrum band. The operations of 1305 may be performed in accordance with examples as disclosed herein. In some examples, aspects of the operations of 1305 may be performed by a sidelink transmission component 1125 as described with reference to FIG. 11.

At 1310, the method may include performing an LBT for each of a set of multiple feedback channel occasions corresponding to the first sidelink data channel in the first sub-band, the set of multiple feedback channel occasions in a set of multiple sub-bands. The operations of 1310 may be performed in accordance with examples as disclosed herein. In some examples, aspects of the operations of 1310 may be performed by an LBT component 1130 as described with reference to FIG. 11.

At 1315, the method may include transmitting feedback associated with the transmission over one or more feedback channel occasions of the set of multiple feedback channel occasions based on the LBT for each of the set of multiple feedback channel occasions. The operations of 1315 may be performed in accordance with examples as disclosed herein. In some examples, aspects of the operations of 1315 may be performed by a feedback transmission component 1135 as described with reference to FIG. 11.

Figure 14:
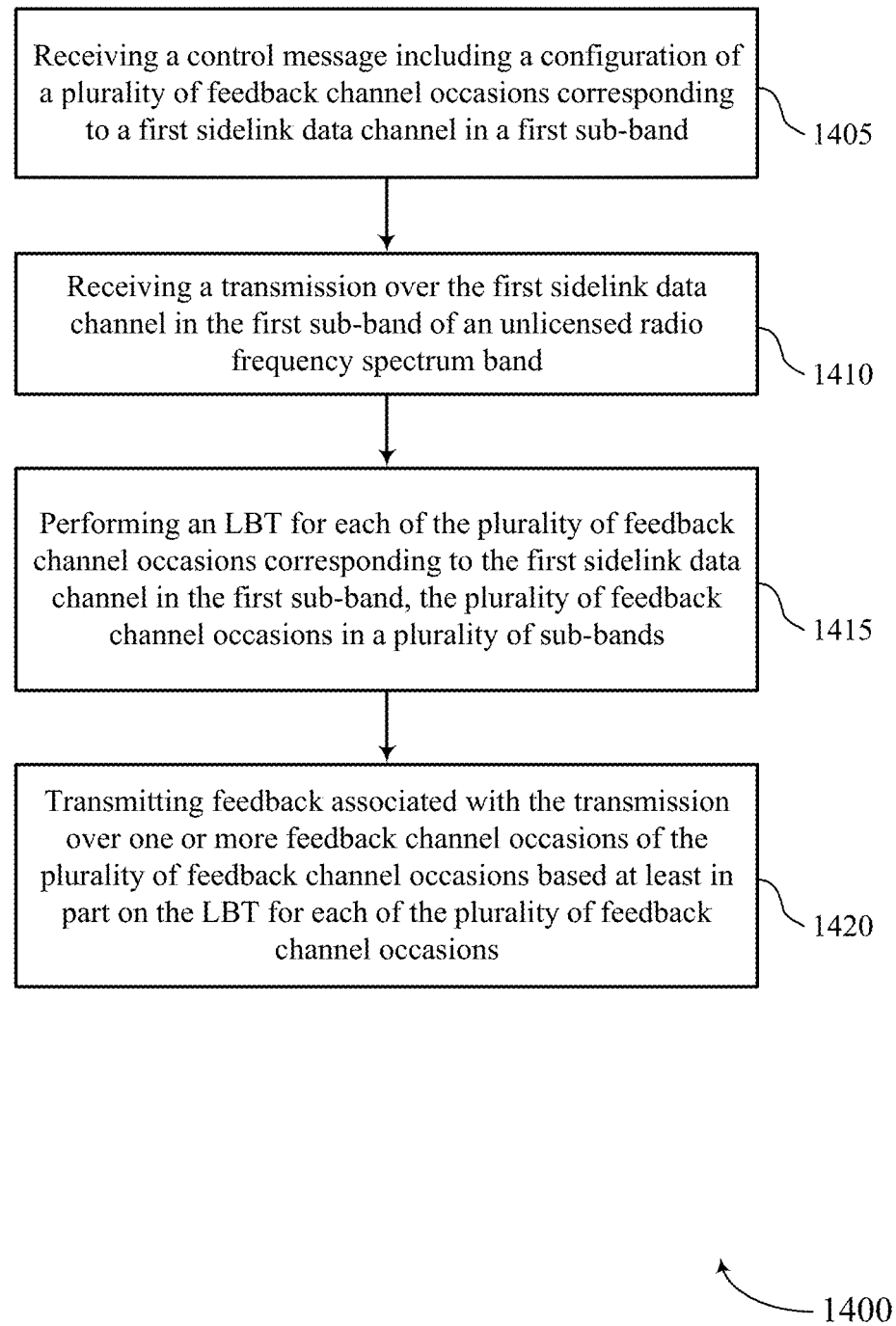

FIG. 14 shows a flowchart illustrating a method 1400 that supports techniques for configuring multiple frequency domain opportunities for sidelink feedback in accordance with various aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include receiving a control message including a configuration of a set of multiple feedback channel occasions corresponding to a first sidelink data channel in a first sub-band. The operations of 1405 may be performed in accordance with examples as disclosed herein. In some examples, aspects of the operations of 1405 may be performed by an PSFCH configuration component 1140 as described with reference to FIG. 11.

At 1410, the method may include receiving a transmission over the first sidelink data channel in the first sub-band of an unlicensed radio frequency spectrum band. The operations of 1410 may be performed in accordance with examples as disclosed herein. In some examples, aspects of the operations of 1410 may be performed by a sidelink transmission component 1125 as described with reference to FIG. 11.

At 1415, the method may include performing an LBT for each of the set of multiple feedback channel occasions corresponding to the first sidelink data channel in the first sub-band, the set of multiple feedback channel occasions in a set of multiple sub-bands. The operations of 1415 may be performed in accordance with examples as disclosed herein. In some examples, aspects of the operations of 1415 may be performed by an LBT component 1130 as described with reference to FIG. 11.

At 1420, the method may include transmitting feedback associated with the transmission over one or more feedback channel occasions of the set of multiple feedback channel occasions based on the LBT for each of the set of multiple feedback channel occasions. The operations of 1420 may be performed in accordance with examples as disclosed herein. In some examples, aspects of the operations of 1420 may be performed by a feedback transmission component 1135 as described with reference to FIG. 11.

Figure 15:
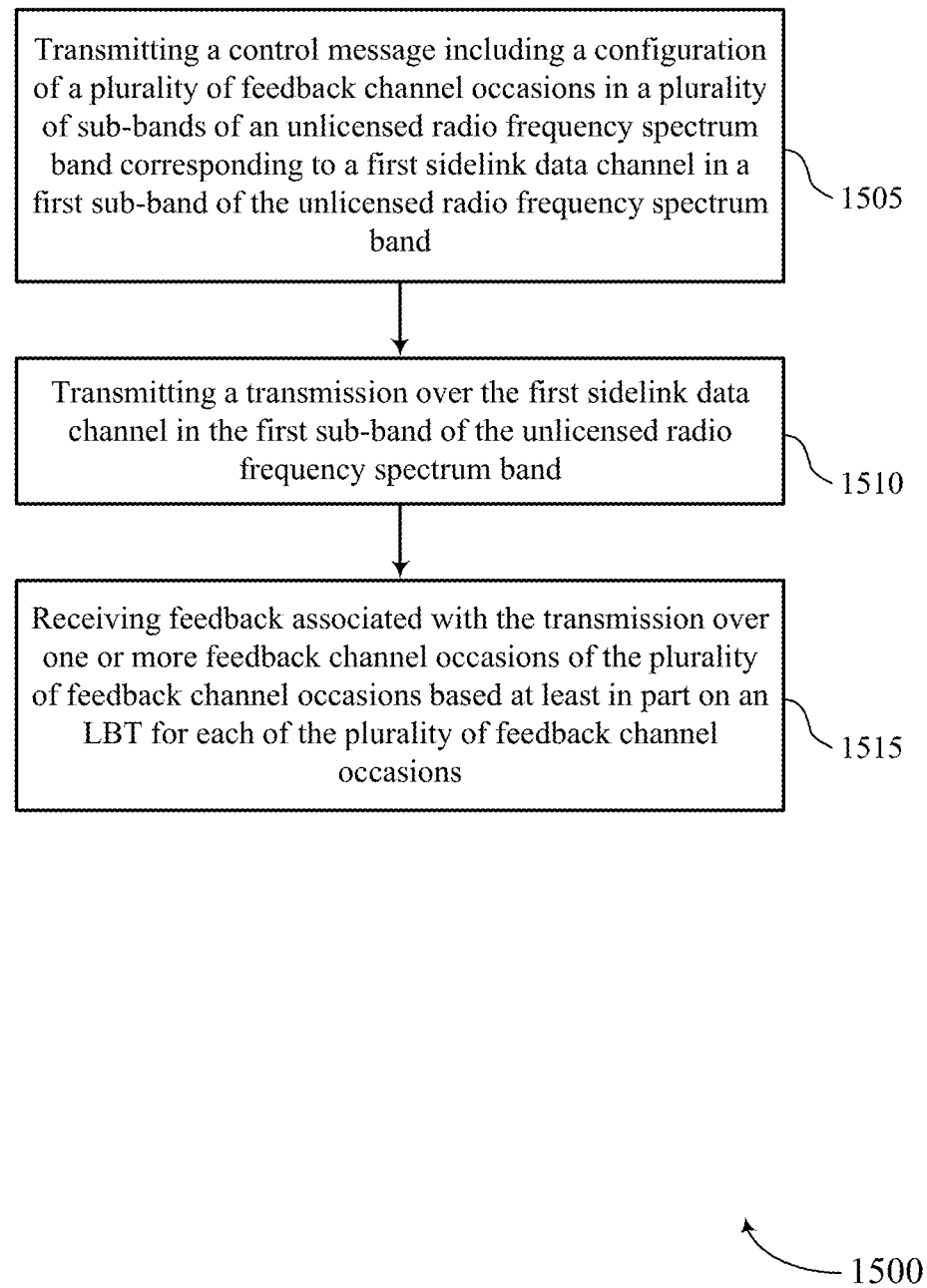

FIG. 15 shows a flowchart illustrating a method 1500 that supports techniques for configuring multiple frequency domain opportunities for sidelink feedback in accordance with various aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include transmitting a control message including a configuration of a set of multiple feedback channel occasions in a set of multiple sub-bands of an unlicensed radio frequency spectrum band corresponding to a first sidelink data channel in a first sub-band of the unlicensed radio frequency spectrum band. The operations of 1505 may be performed in accordance with examples as disclosed herein. In some examples, aspects of the operations of 1505 may be performed by an PSFCH configuration component 1140 as described with reference to FIG. 11.

At 1510, the method may include transmitting a transmission over the first sidelink data channel in the first sub-band of the unlicensed radio frequency spectrum band. The operations of 1510 may be performed in accordance with examples as disclosed herein. In some examples, aspects of the operations of 1510 may be performed by a sidelink transmission component 1125 as described with reference to FIG. 11.

At 1515, the method may include receiving feedback associated with the transmission over one or more feedback channel occasions of the set of multiple feedback channel occasions based on an LBT for each of the set of multiple feedback channel occasions. The operations of 1515 may be performed in accordance with examples as disclosed herein. In some examples, aspects of the operations of 1515 may be performed by a feedback reception component 1145 as described with reference to FIG. 11.

The following provides an overview of aspects of the present disclosure:

Aspect 1: A method for wireless communication at a UE, comprising: receiving a transmission over a first sidelink data channel in a first sub-band of an unlicensed radio frequency spectrum band; performing an LBT for each of a plurality of feedback channel occasions corresponding to the first sidelink data channel in the first sub-band, the plurality of feedback channel occasions in a plurality of sub-bands; and transmitting feedback associated with the transmission over one or more feedback channel occasions of the plurality of feedback channel occasions based at least in part on the LBT for each of the plurality of feedback channel occasions.

Aspect 2: The method of aspect 1, further comprising: receiving a control message including a configuration of the plurality of feedback channel occasions corresponding to the first sidelink data channel in the first sub-band, wherein performing the LBT for each of the plurality of feedback channel occasions is based at least in part on the configuration of the plurality of feedback channel occasions.

Aspect 3: The method of aspect 2, wherein receiving the control message including the configuration of the plurality of feedback channel occasions comprises: receiving the control message including the configuration indicating a plurality of feedback channel pools, each of the plurality of feedback channel pools corresponding to one sub-band of the unlicensed radio frequency spectrum band, wherein the plurality of feedback channel occasions includes the one feedback channel pool of the plurality of feedback channel pools.

Aspect 4: The method of aspect 3, wherein the configuration indicating the plurality of feedback channel pools comprises a plurality of bit vectors, each bit vector indicating a different one of the plurality of feedback channel pools.

Aspect 5: The method of any of aspects 3 through 4, wherein the plurality of feedback channel occasions are associated with groupcast feedback, the method further comprising: determining that a group member ID of the UE is less than a product of a quantity of PRBs of a feedback channel occasion of the plurality of feedback channel occasions and a cyclic shift value associated with the feedback channel occasion; and including the feedback channel occasion in the plurality of feedback channel occasions based at least in part on determining that the group member ID the UE is less than the product of the quantity of PRBs and the cyclic shift value.

Aspect 6: The method of any of aspects 3 through 4, wherein the plurality of feedback channel occasions are associated with groupcast feedback, the method further comprising: determining that a quantity of UEs providing the groupcast feedback is less than a product of a quantity of PRBs of a feedback channel occasion of the plurality of feedback channel occasions and a cyclic shift value associated with the feedback channel occasion; and including the feedback channel occasion in the plurality of feedback channel occasions based at least in part on determining that the quantity of UEs providing the groupcast feedback is less than the product of the quantity of PRBs and the cyclic shift value.

Aspect 7: The method of any of aspects 3 through 4, wherein the plurality of feedback channel occasions are associated with groupcast feedback, the method further comprising: identifying that the plurality of feedback channel occasions includes a first feedback channel occasion in the first sub-band and a second feedback channel occasion in a second sub-band; determining that a first product of a first quantity of PRBs of the first feedback channel occasion and a first cyclic shift value associated with the first feedback channel occasion is less than a second product of a second quantity of PRBs of the second feedback channel occasion and a second cyclic shift value associated with the second feedback channel occasion; and including the first feedback channel occasion and the second feedback channel occasion in the plurality of feedback channel occasions based at least in part on determining that the first product is less than the second product.

Aspect 8: The method of aspect 2, wherein receiving the control message including the configuration of the plurality of feedback channel occasions comprises: receiving the control message including the configuration indicating an index associated with a second sub-band and an offset value between the first sub-band and the second sub-band, wherein the plurality of feedback channel occasions include a first feedback channel occasion located in the first sub-band and a second feedback channel occasion located in the second sub-band.

Aspect 9: The method of aspect 8, wherein the transmission is a unicast transmission, the method further comprising: detecting a second unicast transmission over a second sidelink data channel in the second sub-band based at least in part on the index associated with the second sub-band; and selecting the first feedback channel occasion and the second feedback channel occasion as two of the plurality of feedback channel occasions based at least in part on detecting the second unicast transmission in the second sub-band and a formula.

Aspect 10: The method of aspect 9, wherein the formula comprises a first product of a summation of an ID associated with a transmitting UE from which the transmission is received and the offset value between the first sub-band and the second sub-band and a modulo operation of a second product of a quantity of PRBs of the first feedback channel occasion and a cyclic shift value associated with the first feedback channel occasion.

Aspect 11: The method of any of aspects 1 through 10, wherein transmitting the feedback associated with the transmission over the one or more feedback channel occasions of the plurality of feedback channel occasions comprises: transmitting the feedback over each feedback channel occasion of the plurality of feedback channel occasions that is associated with a successful LBT and that is located in an earliest symbol period including a feedback channel occasion.

Aspect 12: The method of any of aspects 1 through 11, further comprising: receiving a configuration indicating a primary feedback channel occasion and one or more secondary feedback channel occasions of the plurality of feedback channel occasions, wherein transmitting the feedback associated with the transmission over the one or more feedback channel occasions of the plurality of feedback channel occasions comprises: transmitting the feedback over the primary feedback channel occasion or over any of the one or more secondary feedback channel occasions based at least in part on whether the primary feedback channel occasion is associated with a successful LBT.

Aspect 13: The method of any of aspects 1 through 12, further comprising: receiving a configuration indicating a priority of the plurality of feedback channel occasions, wherein transmitting the feedback associated with the transmission over the one or more feedback channel occasions of the plurality of feedback channel occasions comprises: transmitting the feedback over a feedback channel occasion of the plurality of feedback channel occasions that has a highest priority and that is associated with a successful LBT.

Aspect 14: The method of any of aspects 1 through 13, wherein transmitting the feedback associated with the transmission over the one or more feedback channel occasions of the plurality of feedback channel occasions comprises: transmitting the feedback over each feedback channel occasion of the plurality of feedback channel occasions that is associated with a successful LBT.

Aspect 15: The method of any of aspects 1 through 14, wherein transmitting the feedback associated with the transmission over the one or more feedback channel occasions of the plurality of feedback channel occasions comprises: transmitting the feedback over a first feedback channel occasion within a same COT of the transmission based at least in part on a cyclic prefix extension.

Aspect 16: The method of aspect 15, further comprising: determining that a priority of the transmission satisfies a threshold priority, that the first feedback channel occasion is an only feedback channel occasion that satisfies a packet delay budget of the transmission, that the first feedback channel occasion is in a last symbol period including a feedback channel occasion, that previous cyclic prefix extensions have occurred below a threshold amount, that the first feedback channel occasion is configured for transmitting the feedback within the same COT, or any combination thereof, wherein transmitting the feedback over the first feedback channel occasion within the same COT of the transmission is based at least in part on the determining.

Aspect 17: A method for wireless communication at a UE, comprising: transmitting a control message including a configuration of a plurality of feedback channel occasions in a plurality of sub-bands of an unlicensed radio frequency spectrum band corresponding to a first sidelink data channel in a first sub-band of the unlicensed radio frequency spectrum band; transmitting a transmission over the first sidelink data channel in the first sub-band of the unlicensed radio frequency spectrum band; and receiving feedback associated with the transmission over one or more feedback channel occasions of the plurality of feedback channel occasions based at least in part on an LBT for each of the plurality of feedback channel occasions.

Aspect 18: The method of aspect 17, wherein transmitting the control message including the configuration of the plurality of feedback channel occasions comprises: transmitting the control message including the configuration indicating a plurality of feedback channel pools, each of the plurality of feedback channel pools corresponding to one sub-band of the unlicensed radio frequency spectrum band, wherein the plurality of feedback channel occasions includes one feedback channel pool of the plurality of feedback channel pools.

Aspect 19: The method of aspect 18, wherein the configuration indicating the plurality of feedback channel pools comprises a plurality of bit vectors, each bit vector indicating a different one of the plurality of feedback channel pools.

Aspect 20: The method of aspect 17, wherein transmitting the control message including the configuration of the plurality of feedback channel occasions comprises: transmitting the control message including the configuration indicating an index associated with a second sub-band and an offset value between the first sub-band and the second sub-band, wherein the plurality of feedback channel occasions include a first feedback channel occasion located in the first sub-band and a second feedback channel occasion located in the second sub-band.

Aspect 21: The method of any of aspects 17 through 20, wherein receiving the feedback associated with the transmission over the one or more feedback channel occasions of the plurality of feedback channel occasions comprises: receiving the feedback over each feedback channel occasion of the plurality of feedback channel occasions that is associated with a successful LBT and that is located in an earliest symbol period including a feedback channel occasion.

Aspect 22: The method of any of aspects 17 through 21, wherein transmitting the control message comprises transmitting the configuration indicating a primary feedback channel occasion and one or more secondary feedback channel occasions of the plurality of feedback channel occasions; and receiving the feedback associated with the transmission over the one or more feedback channel occasions of the plurality of feedback channel occasions comprises receiving the feedback over the primary feedback channel occasion or over any of the one or more secondary feedback channel occasions based at least in part on whether the primary feedback channel occasion is associated with a successful LBT.

Aspect 23: The method of any of aspects 17 through 22, wherein transmitting the control message comprises transmitting the configuration indicating a priority of the plurality of feedback channel occasions; and receiving the feedback associated with the transmission over the one or more feedback channel occasions of the plurality of feedback channel occasions comprises receiving the feedback over a feedback channel occasion of the plurality of feedback channel occasions that has a highest priority and that is associated with a successful LBT.

Aspect 24: The method of any of aspects 17 through 23, wherein receiving the feedback associated with the transmission over the one or more feedback channel occasions of the plurality of feedback channel occasions comprises: receiving the feedback over each feedback channel occasion of the plurality of feedback channel occasions that is associated with a successful LBT.

Aspect 25: The method of any of aspects 17 through 24, wherein receiving the feedback associated with the transmission over the one or more feedback channel occasions of the plurality of feedback channel occasions comprises: receiving the feedback over a first feedback channel occasion within a same COT of the transmission based at least in part on a cyclic prefix extension.

Aspect 26: An apparatus for wireless communication at a UE, comprising a processor; memory coupled with the processor; and instructions stored in the memory and executable by the processor to cause the apparatus to perform a method of any of aspects 1 through 16.

Aspect 27: An apparatus for wireless communication at a UE, comprising at least one means for performing a method of any of aspects 1 through 16.

Aspect 28: A non-transitory computer-readable medium storing code for wireless communication at a UE, the code comprising instructions executable by a processor to perform a method of any of aspects 1 through 16.

Aspect 29: An apparatus for wireless communication at a UE, comprising a processor; memory coupled with the processor; and instructions stored in the memory and executable by the processor to cause the apparatus to perform a method of any of aspects 17 through 25.

Aspect 30: An apparatus for wireless communication at a UE, comprising at least one means for performing a method of any of aspects 17 through 25.

Aspect 31: A non-transitory computer-readable medium storing code for wireless communication at a UE, the code comprising instructions executable by a processor to perform a method of any of aspects 17 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes examples and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from a second UE, a control message including a configuration of a plurality of feedback channel occasions for transmitting feedback associated with a transmission, the plurality of feedback channel occasions corresponding to a first sidelink data channel in a first sub-band of an unlicensed radio frequency spectrum band;
receiving, from the second UE, the transmission over the first sidelink data channel in the first sub-band of the unlicensed radio frequency spectrum band;
performing, based at least in part on the configuration of the plurality of feedback channel occasions, a listen-before-talk for each of the plurality of feedback channel occasions, the plurality of feedback channel occasions associated with the transmission received from the second UE over the first sidelink data channel in the first sub-band, the plurality of feedback channel occasions in a plurality of sub-bands, the UE operable to transmit, to the second UE, the feedback associated with the transmission using one or more of the plurality of feedback channel occasions; and
transmitting, to the second UE, the feedback associated with the transmission over one or more feedback channel occasions of the plurality of feedback channel occasions based at least in part on performing the listen-before-talk for each of the plurality of feedback channel occasions.

2. The method of claim 1, wherein receiving the control message including the configuration of the plurality of feedback channel occasions comprises:
receiving the control message including the configuration indicating a plurality of feedback channel pools, each of the plurality of feedback channel pools corresponding to one sub-band of the unlicensed radio frequency spectrum band, wherein the plurality of feedback channel occasions includes one feedback channel pool of the plurality of feedback channel pools.

3. The method of claim 2, wherein the configuration indicating the plurality of feedback channel pools comprises a plurality of bit vectors, each bit vector indicating a different one of the plurality of feedback channel pools.

4. The method of claim 2, wherein the plurality of feedback channel occasions are associated with groupcast feedback, the method further comprising:
determining that a group member identifier of the UE is less than a product of a quantity of physical resource blocks of a feedback channel occasion of the plurality of feedback channel occasions and a cyclic shift value associated with the feedback channel occasion; and
including the feedback channel occasion in the plurality of feedback channel occasions based at least in part on determining that the group member identifier of the UE is less than the product of the quantity of physical resource blocks and the cyclic shift value.

5. The method of claim 2, wherein the plurality of feedback channel occasions are associated with groupcast feedback, the method further comprising:
determining that a quantity of UEs providing the groupcast feedback is less than a product of a quantity of physical resource blocks of a feedback channel occasion of the plurality of feedback channel occasions and a cyclic shift value associated with the feedback channel occasion; and
including the feedback channel occasion in the plurality of feedback channel occasions based at least in part on determining that the quantity of UEs providing the groupcast feedback is less than the product of the quantity of physical resource blocks and the cyclic shift value.

6. The method of claim 2, wherein the plurality of feedback channel occasions are associated with groupcast feedback, the method further comprising:
- identifying that the plurality of feedback channel occasions includes a first feedback channel occasion in the first sub-band and a second feedback channel occasion in a second sub-band;
- determining that a first product of a first quantity of physical resource blocks of the first feedback channel occasion and a first cyclic shift value associated with the first feedback channel occasion is less than a second product of a second quantity of physical resource blocks of the second feedback channel occasion and a second cyclic shift value associated with the second feedback channel occasion; and
- including the first feedback channel occasion and the second feedback channel occasion in the plurality of feedback channel occasions based at least in part on determining that the first product is less than the second product.

7. The method of claim 1, wherein receiving the control message including the configuration of the plurality of feedback channel occasions comprises:
- receiving the control message including the configuration indicating an index associated with a second sub-band and an offset value between the first sub-band and the second sub-band, wherein the plurality of feedback channel occasions include a first feedback channel occasion located in the first sub-band and a second feedback channel occasion located in the second sub-band.

8. The method of claim 7, wherein the transmission is a unicast transmission, the method further comprising:
- detecting a second unicast transmission over a second sidelink data channel in the second sub-band based at least in part on the index associated with the second sub-band; and
- selecting the first feedback channel occasion and the second feedback channel occasion as two of the plurality of feedback channel occasions based at least in part on detecting the second unicast transmission in the second sub-band and a formula.

9. The method of claim 8, wherein the formula comprises a first product of a summation of an identifier associated with the second UE from which the transmission is received and the offset value between the first sub-band and the second sub-band and a modulo operation of a second product of a quantity of physical resource blocks of the first feedback channel occasion and a cyclic shift value associated with the first feedback channel occasion.

10. The method of claim 1, wherein transmitting the feedback associated with the transmission over the one or more feedback channel occasions of the plurality of feedback channel occasions comprises:
- transmitting the feedback over each feedback channel occasion of the plurality of feedback channel occasions that is associated with a successful listen-before-talk and that is located in an earliest symbol period including a feedback channel occasion.

11. The method of claim 1, further comprising:
- receiving a configuration indicating a primary feedback channel occasion and one or more secondary feedback channel occasions of the plurality of feedback channel occasions, wherein transmitting the feedback associated with the transmission over the one or more feedback channel occasions of the plurality of feedback channel occasions comprises:
- transmitting the feedback over the primary feedback channel occasion or over any of the one or more secondary feedback channel occasions based at least in part on whether the primary feedback channel occasion is associated with a successful listen-before-talk.

12. The method of claim 1, further comprising:
- receiving a configuration indicating a priority of the plurality of feedback channel occasions, wherein transmitting the feedback associated with the transmission over the one or more feedback channel occasions of the plurality of feedback channel occasions comprises:
- transmitting the feedback over a feedback channel occasion of the plurality of feedback channel occasions that has a highest priority and that is associated with a successful listen-before-talk.

13. The method of claim 1, wherein transmitting the feedback associated with the transmission over the one or more feedback channel occasions of the plurality of feedback channel occasions comprises:
- transmitting the feedback over each feedback channel occasion of the plurality of feedback channel occasions that is associated with a successful listen-before-talk.

14. The method of claim 1, wherein transmitting the feedback associated with the transmission over the one or more feedback channel occasions of the plurality of feedback channel occasions comprises:
- transmitting the feedback over a first feedback channel occasion within a same channel occupancy time of the transmission based at least in part on a cyclic prefix extension.

15. The method of claim 14, further comprising:
- determining that a priority of the transmission satisfies a threshold priority, that the first feedback channel occasion is an only feedback channel occasion that satisfies a packet delay budget of the transmission, that the first feedback channel occasion is in a last symbol period including a feedback channel occasion, that previous cyclic prefix extensions have occurred below a threshold amount, that the first feedback channel occasion is configured for transmitting the feedback within the same channel occupancy time, or any combination thereof, wherein transmitting the feedback over the first feedback channel occasion within the same channel occupancy time of the transmission is based at least in part on the determining.

16. A method for wireless communication at a user equipment (UE), comprising:
- transmitting, to a second UE, a control message including a configuration of a plurality of feedback channel occasions in a plurality of sub-bands of an unlicensed radio frequency spectrum band, the plurality of feedback channel occasions for feedback associated with a transmission and corresponding to a first sidelink data channel in a first sub-band of the unlicensed radio frequency spectrum band;
- transmitting, to the second UE, the transmission over the first sidelink data channel in the first sub-band of the unlicensed radio frequency spectrum band, the plurality of feedback channel occasions associated with the transmission transmitted to the second UE over the first sidelink data channel in the first sub-band, the UE operable to receive, from the second UE, the feedback associated with the transmission using one or more of the plurality of feedback channel occasions; and
- receiving, from the second UE, the feedback associated with the transmission over one or more feedback channel occasions of the plurality of feedback channel occasions based at least in part on a listen-before-talk for each of the plurality of feedback channel occasions, wherein the listen-before-talk for each of the plurality of feedback channel occasions is based at least in part on the configuration of the plurality of feedback channel occasions.

17. The method of claim 16, wherein transmitting the control message including the configuration of the plurality of feedback channel occasions comprises:
transmitting the control message including the configuration indicating a plurality of feedback channel pools, each of the plurality of feedback channel pools corresponding to one sub-band of the unlicensed radio frequency spectrum band, wherein the plurality of feedback channel occasions includes one feedback channel pool of the plurality of feedback channel pools.

18. The method of claim 17, wherein the configuration indicating the plurality of feedback channel pools comprises a plurality of bit vectors, each bit vector indicating a different one of the plurality of feedback channel pools.

19. The method of claim 16, wherein transmitting the control message including the configuration of the plurality of feedback channel occasions comprises:
transmitting the control message including the configuration indicating an index associated with a second sub-band and an offset value between the first sub-band and the second sub-band, wherein the plurality of feedback channel occasions include a first feedback channel occasion located in the first sub-band and a second feedback channel occasion located in the second sub-band.

20. The method of claim 16, wherein receiving the feedback associated with the transmission over the one or more feedback channel occasions of the plurality of feedback channel occasions comprises:
receiving the feedback over each feedback channel occasion of the plurality of feedback channel occasions that is associated with a successful listen-before-talk and that is located in an earliest symbol period including a feedback channel occasion.

21. The method of claim 16, wherein:
transmitting the control message comprises transmitting the configuration indicating a primary feedback channel occasion and one or more secondary feedback channel occasions of the plurality of feedback channel occasions; and
receiving the feedback associated with the transmission over the one or more feedback channel occasions of the plurality of feedback channel occasions comprises receiving the feedback over the primary feedback channel occasion or over any of the one or more secondary feedback channel occasions based at least in part on whether the primary feedback channel occasion is associated with a successful listen-before-talk.

22. The method of claim 16, wherein:
transmitting the control message comprises transmitting the configuration indicating a priority of the plurality of feedback channel occasions; and
receiving the feedback associated with the transmission over the one or more feedback channel occasions of the plurality of feedback channel occasions comprises receiving the feedback over a feedback channel occasion of the plurality of feedback channel occasions that has a highest priority and that is associated with a successful listen-before-talk.

23. The method of claim 16, wherein receiving the feedback associated with the transmission over the one or more feedback channel occasions of the plurality of feedback channel occasions comprises:
receiving the feedback over each feedback channel occasion of the plurality of feedback channel occasions that is associated with a successful listen-before-talk.

24. The method of claim 16, wherein receiving the feedback associated with the transmission over the one or more feedback channel occasions of the plurality of feedback channel occasions comprises:
receiving the feedback over a first feedback channel occasion within a same channel occupancy time of the transmission based at least in part on a cyclic prefix extension.

25. An apparatus for wireless communication at a user equipment (UE), comprising:
a processor;
memory coupled with the processor; and
instructions stored in the memory and executable by the processor to cause the apparatus to:
receive, from a second UE, a control message including a configuration of a plurality of feedback channel occasions for transmitting feedback associated with a transmission, the plurality of feedback channel occasions corresponding to a first sidelink data channel in a first sub-band of an unlicensed radio frequency spectrum band;
receive, from the second UE, the transmission over the first sidelink data channel in the first sub-band of the unlicensed radio frequency spectrum band;
perform, based at least in part on the configuration of the plurality of feedback channel occasions, a listen-before-talk for each of the plurality of feedback channel occasions, the plurality of feedback channel occasions associated with the transmission received from the second UE over the first sidelink data channel in the first sub-band, the plurality of feedback channel occasions in a plurality of sub-bands, the UE operable to transmit, to the second UE, the feedback associated with the transmission using one or more of the plurality of feedback channel occasions; and
transmit, to the second UE, the feedback associated with the transmission over one or more feedback channel occasions of the plurality of feedback channel occasions based at least in part on performing the listen-before-talk for each of the plurality of feedback channel occasions.

26. The apparatus of claim 25, wherein the instructions to receive the control message including the configuration of the plurality of feedback channel occasions are executable by the processor to cause the apparatus to:
receive the control message including the configuration indicating a plurality of feedback channel pools, each of the plurality of feedback channel pools corresponding to one sub-band of the unlicensed radio frequency spectrum band, wherein the plurality of feedback channel occasions includes one feedback channel pool of the plurality of feedback channel pools.

27. The apparatus of claim 25, wherein the instructions to receive the control message including the configuration of the plurality of feedback channel occasions are executable by the processor to cause the apparatus to:
receive the control message including the configuration indicating an index associated with a second sub-band and an offset value between the first sub-band and the second sub-band, wherein the plurality of feedback channel occasions include a first feedback channel occasion located in the first sub-band and a second feedback channel occasion located in the second sub-band.

28. An apparatus for wireless communication at a user equipment (UE), comprising:
a processor;
memory coupled with the processor; and
instructions stored in the memory and executable by the processor to cause the apparatus to:
transmit, to a second UE, a control message including a configuration of a plurality of feedback channel occasions in a plurality of sub-bands of an unlicensed radio frequency spectrum band, the plurality of feedback channel occasions for feedback associated with a transmission and corresponding to a first sidelink data channel in a first sub-band of the unlicensed radio frequency spectrum band;
transmit, to the second UE, the transmission over the first sidelink data channel in the first sub-band of the unlicensed radio frequency spectrum band, the plurality of feedback channel occasions associated with the transmission transmitted to the second UE over the first sidelink data channel in the first sub-band, the UE operable to receive, from the second UE, the feedback associated with the transmission using one or more of the plurality of feedback channel occasions; and
receive, from the second UE, the feedback associated with the transmission over one or more feedback channel occasions of the plurality of feedback channel occasions based at least in part on a listen-before-talk for each of the plurality of feedback channel occasions, wherein the listen-before-talk for each of the plurality of feedback channel occasions is based at least in part on the configuration of the plurality of feedback channel occasions.

* * * * *